April 9, 1929.  T. A. BANNING, JR  1,708,409
TRANSMISSION DEVICE
Filed Dec. 29, 1923  13 Sheets-Sheet 4
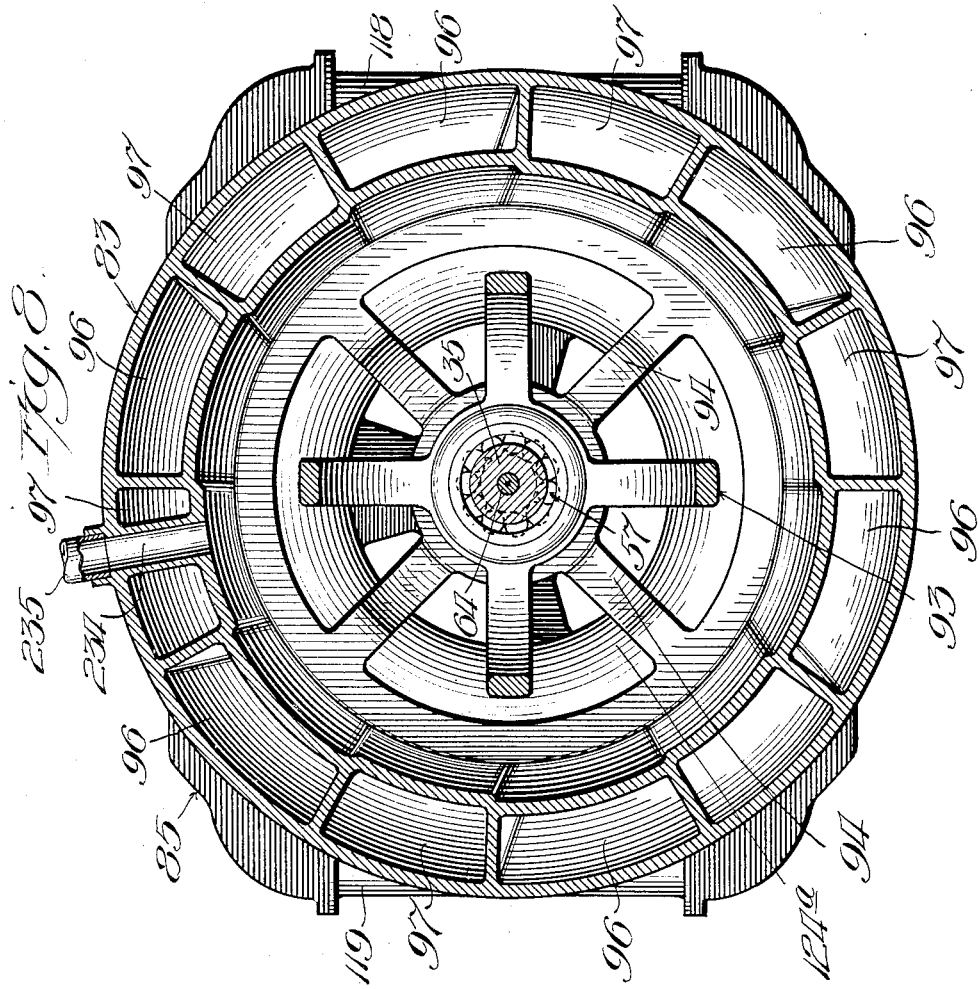
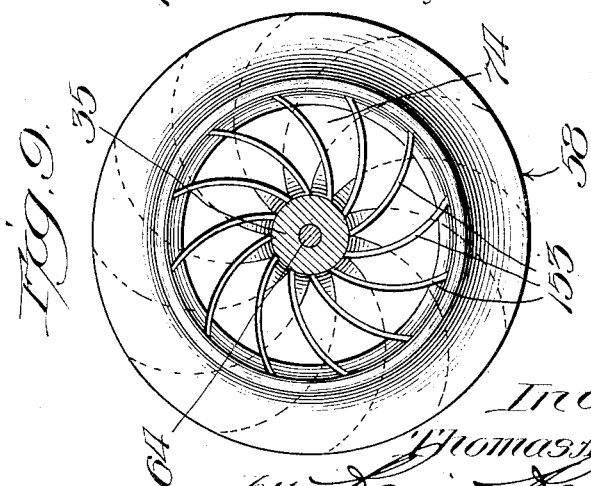

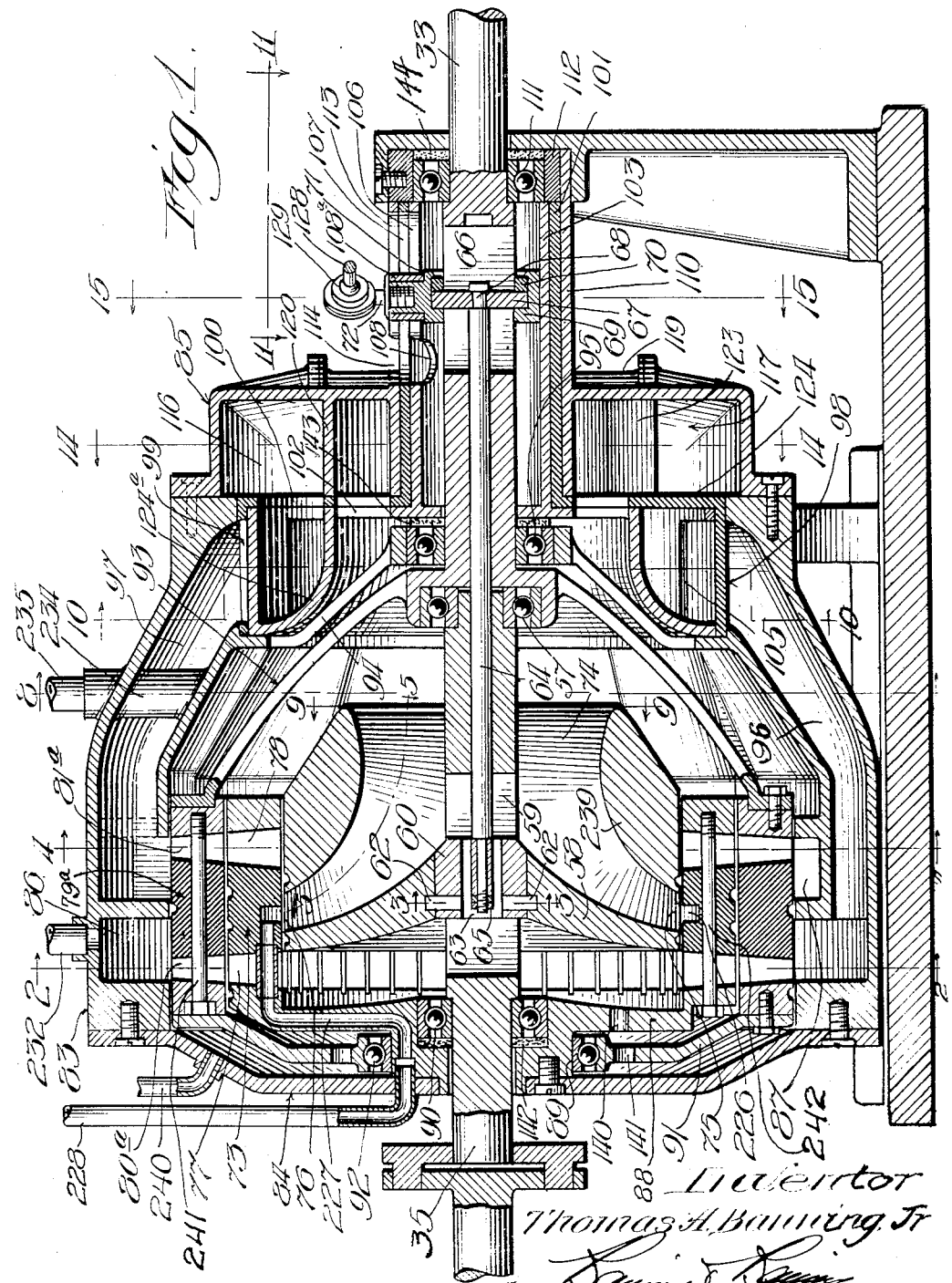

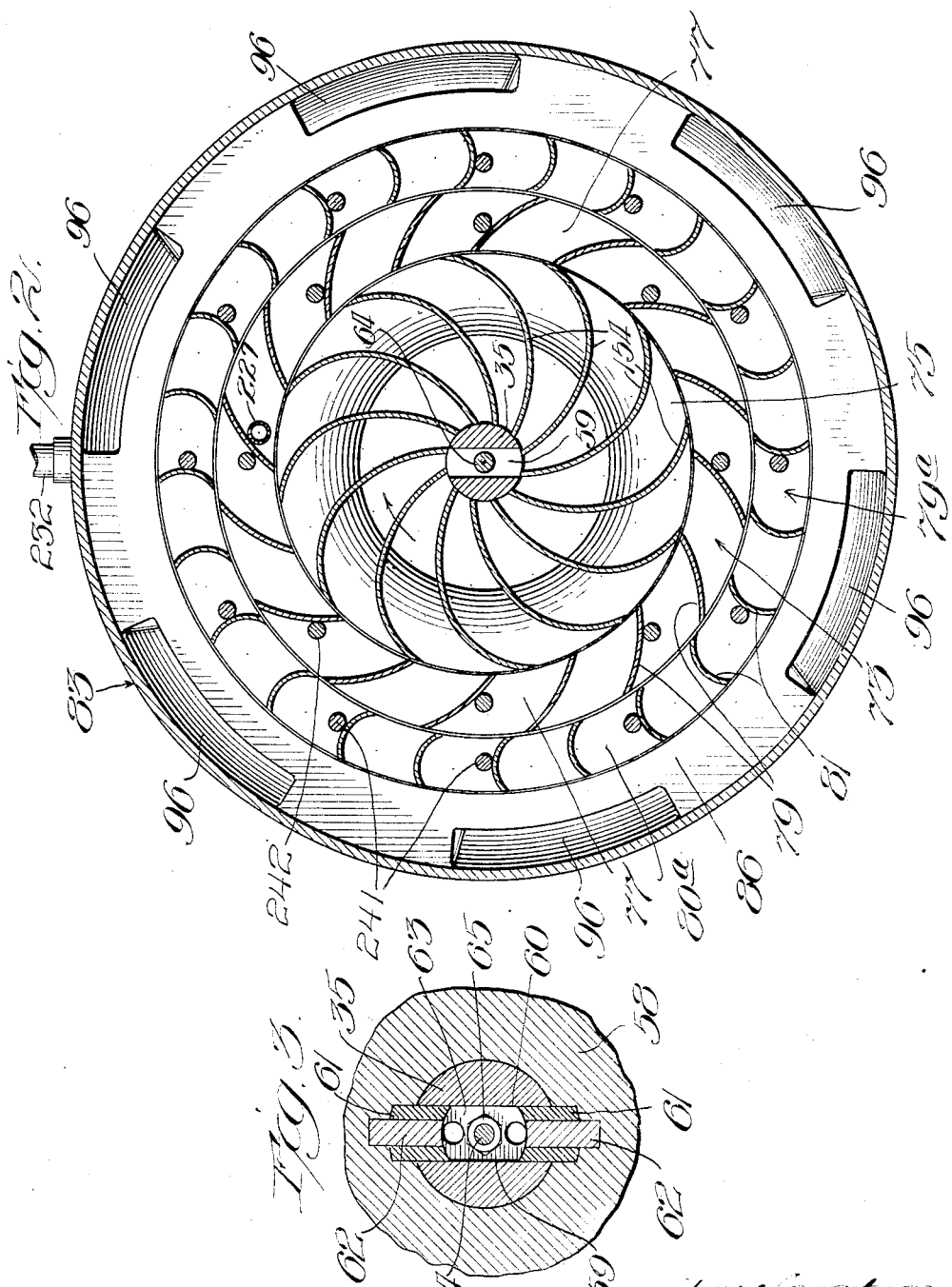

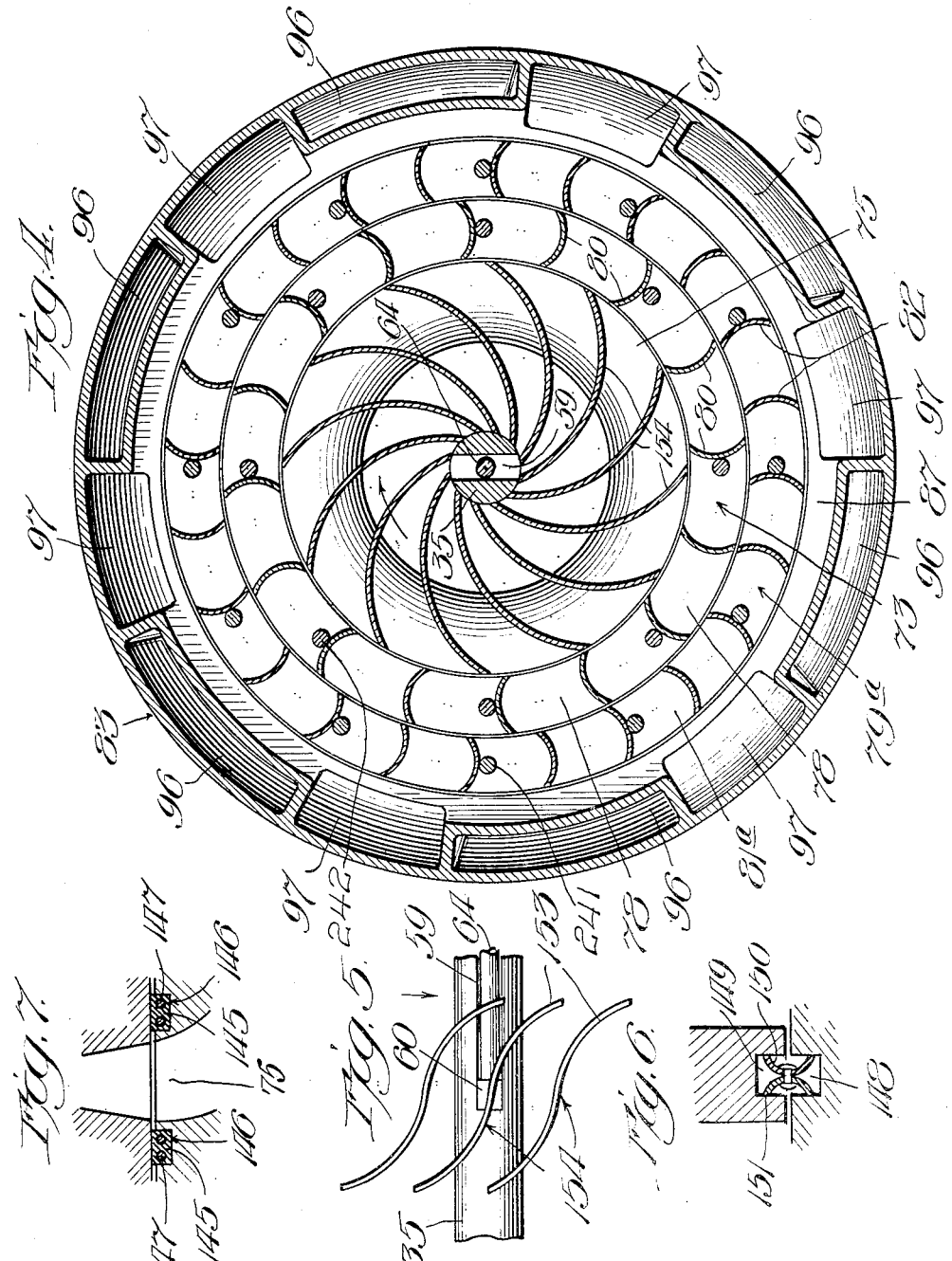

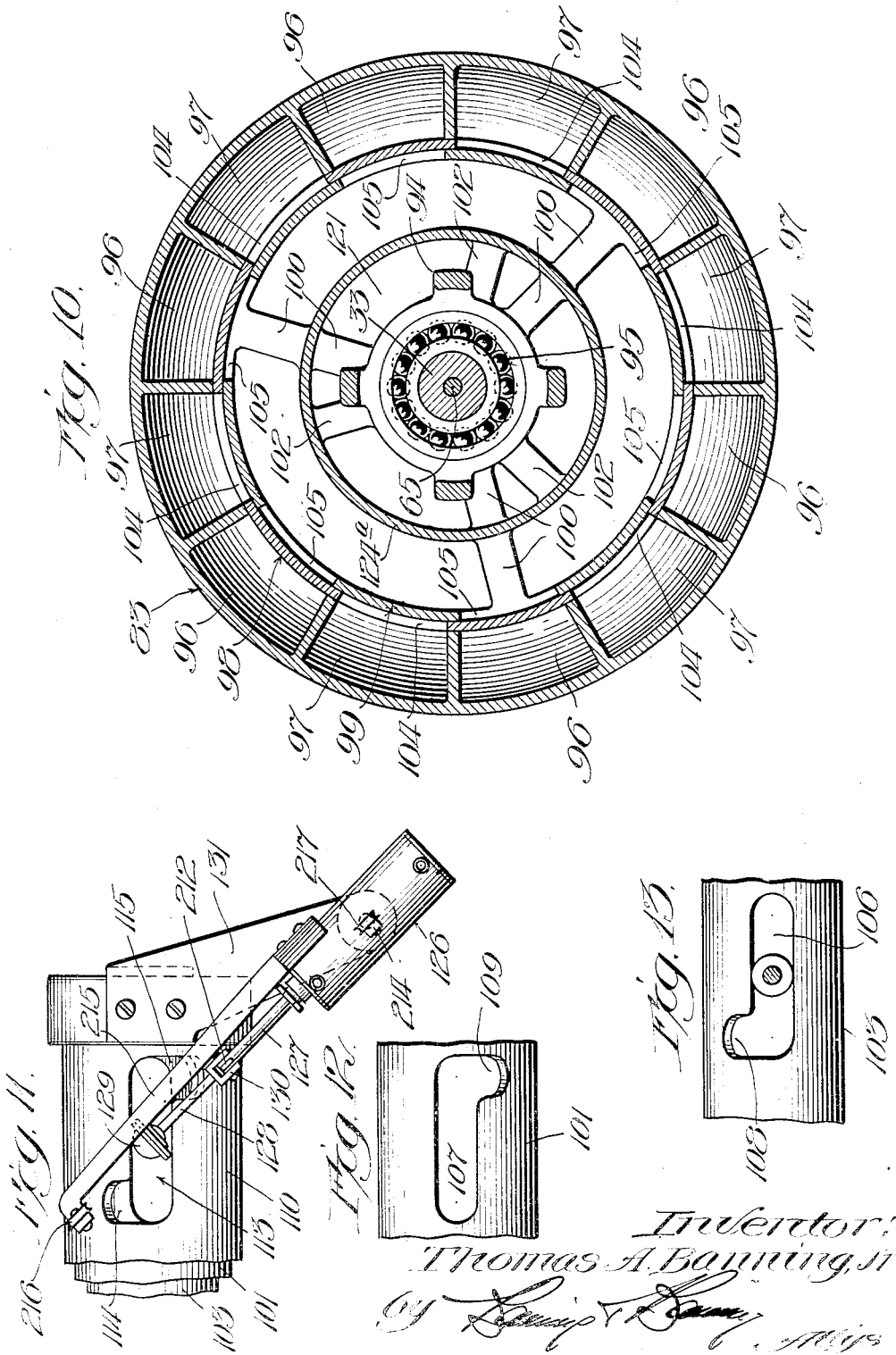

April 9, 1929.  T. A. BANNING, JR  1,708,409
TRANSMISSION DEVICE
Filed Dec. 29, 1923  13 Sheets-Sheet 6
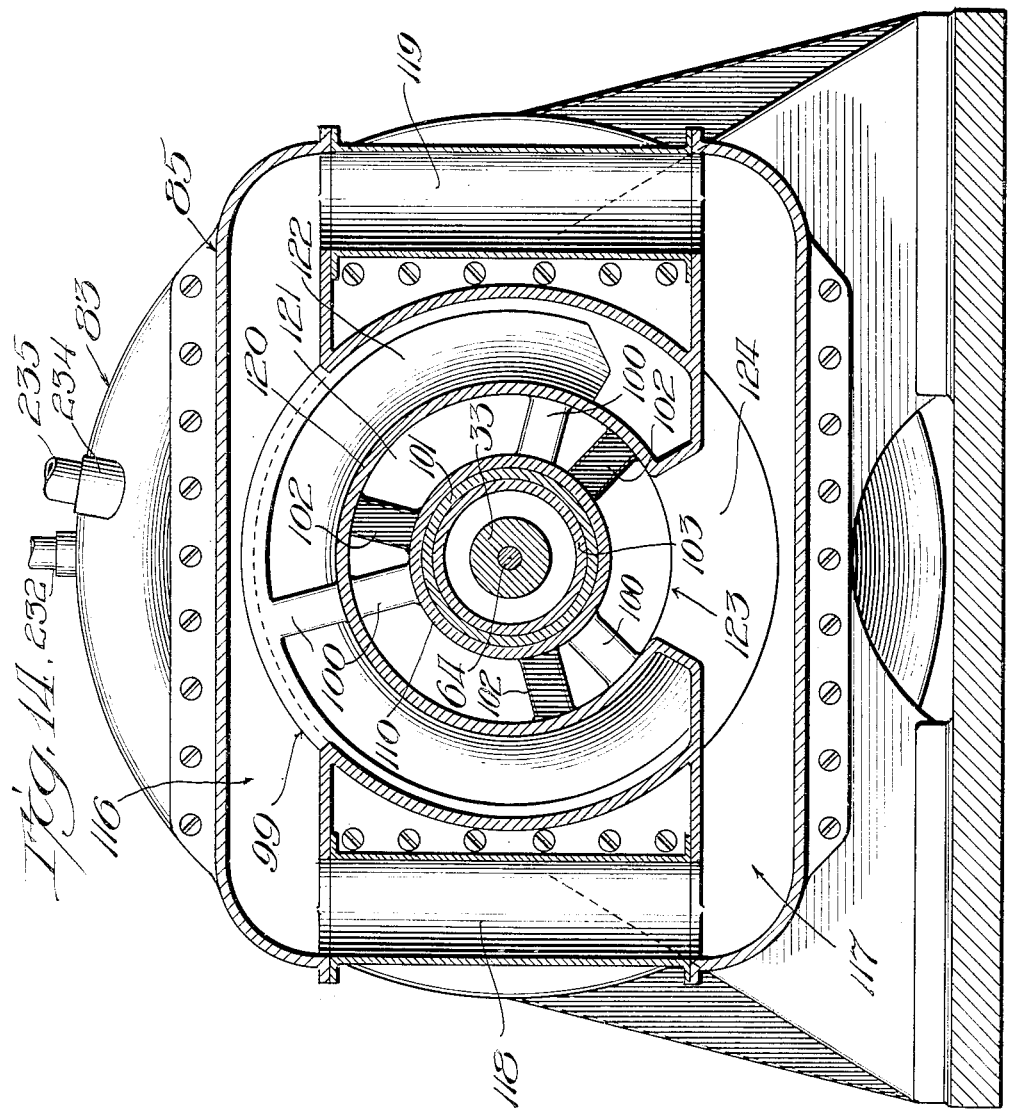
Inventor:
Thomas A. Banning, Jr.
by Banning & Banning
Attys April 9, 1929. T. A. BANNING, JR 1,708,409
TRANSMISSION DEVICE
Filed Dec. 29, 1923 13 Sheets-Sheet 7
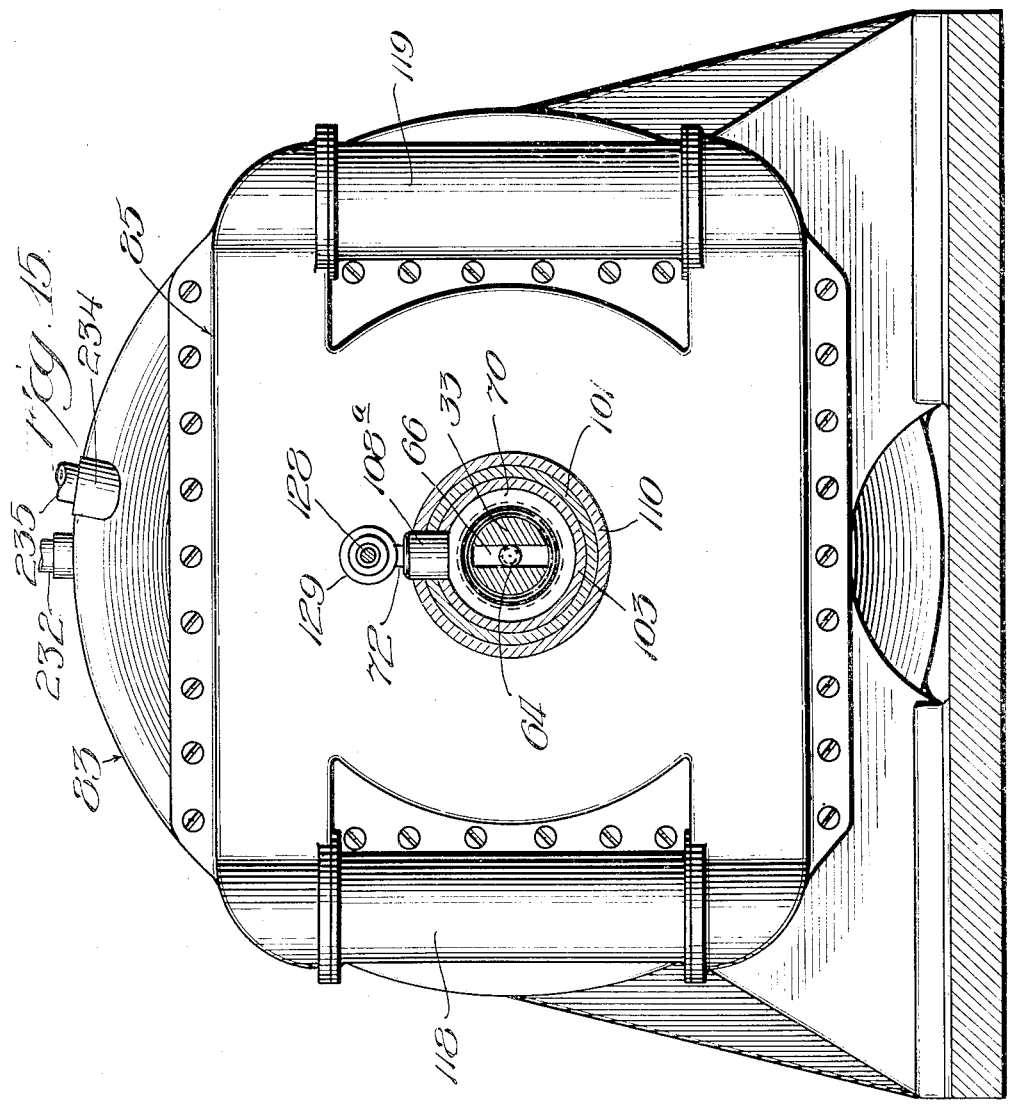

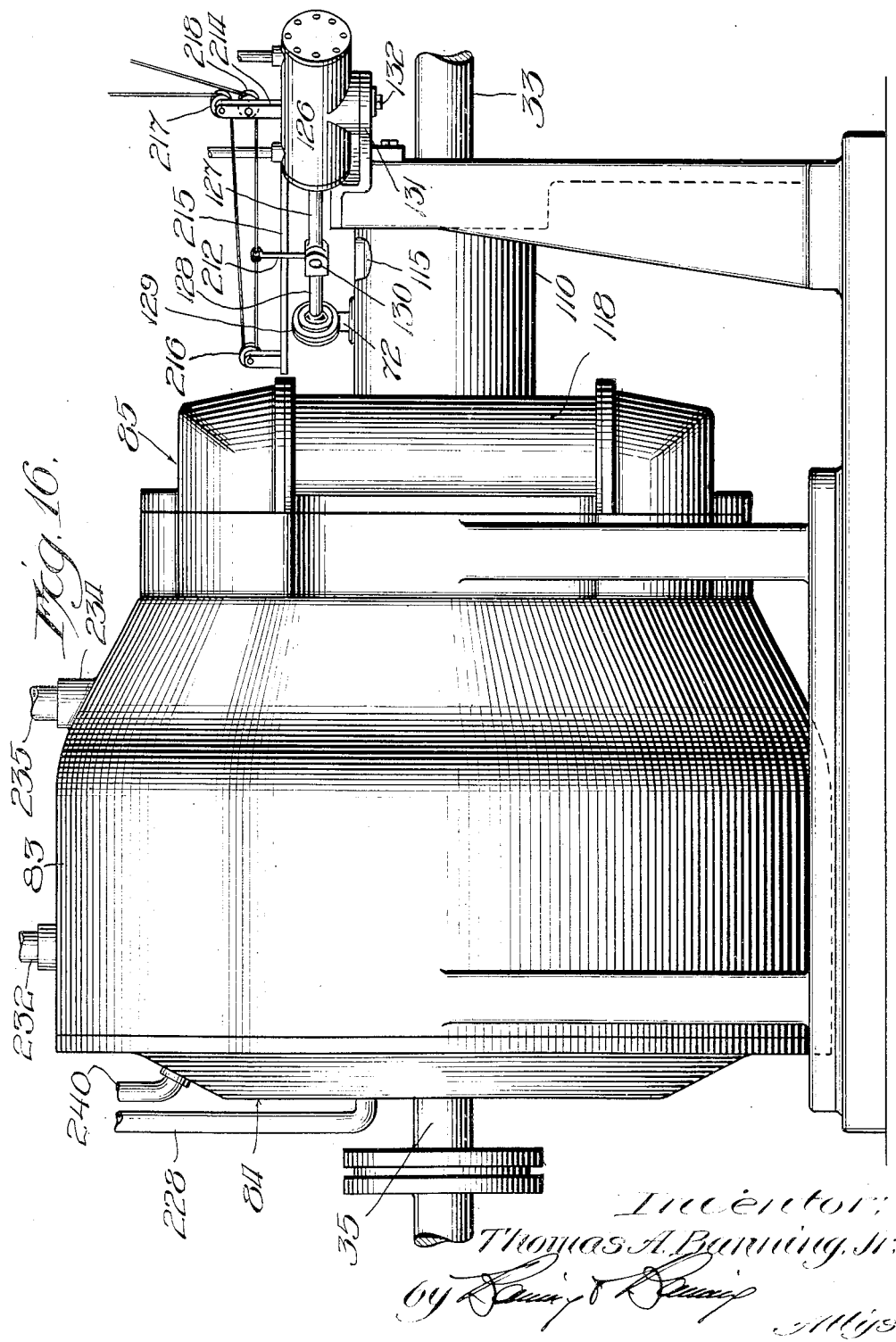

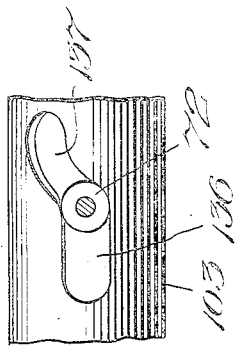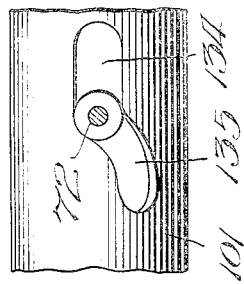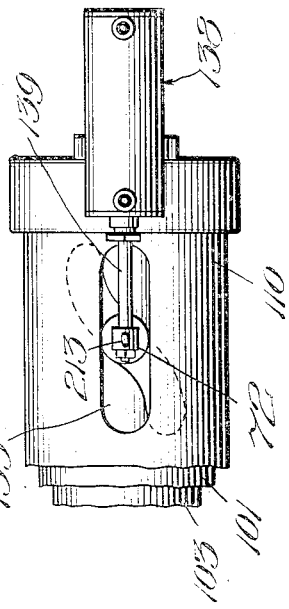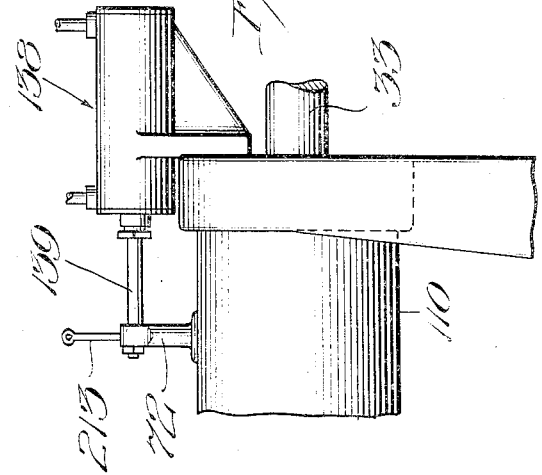

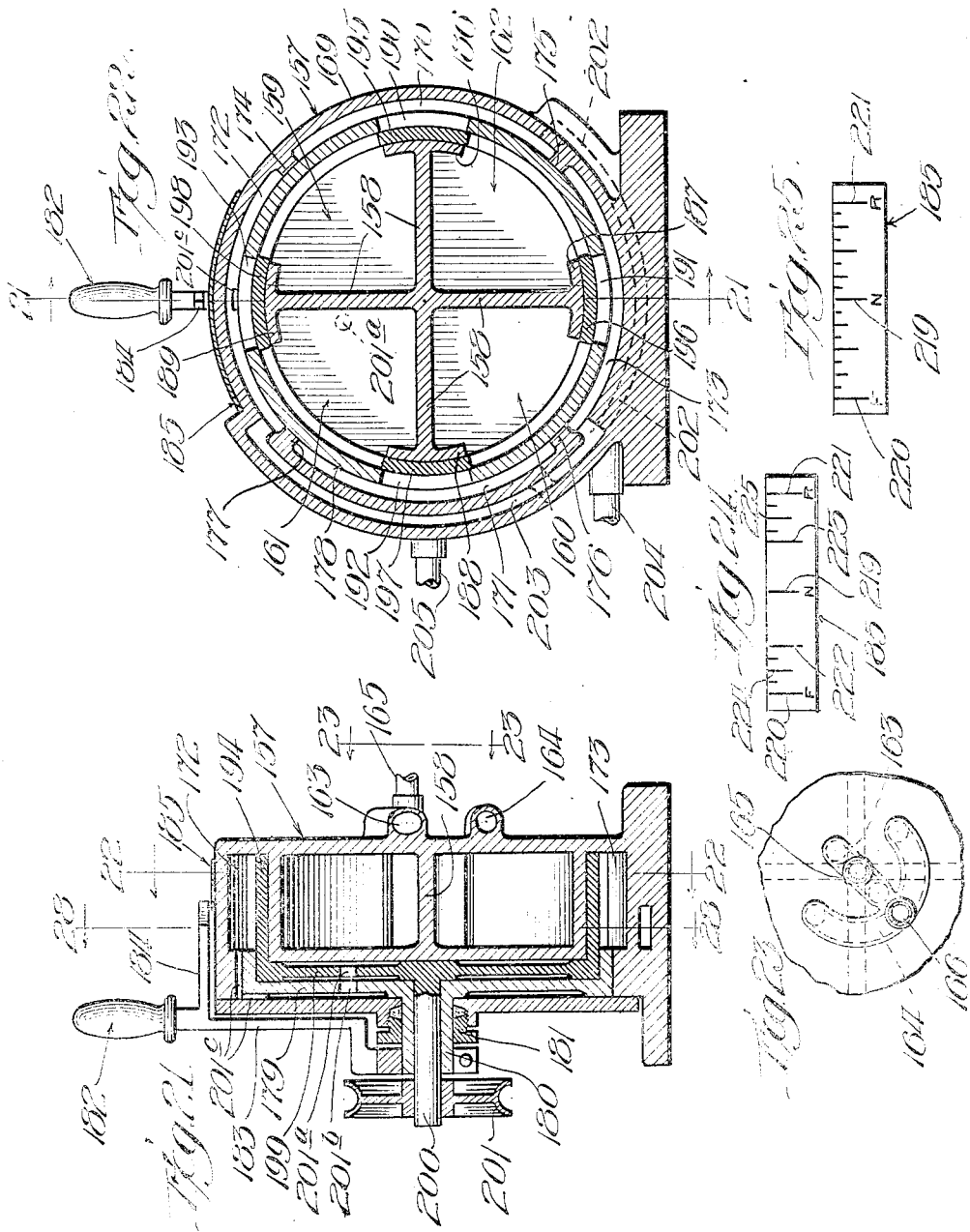

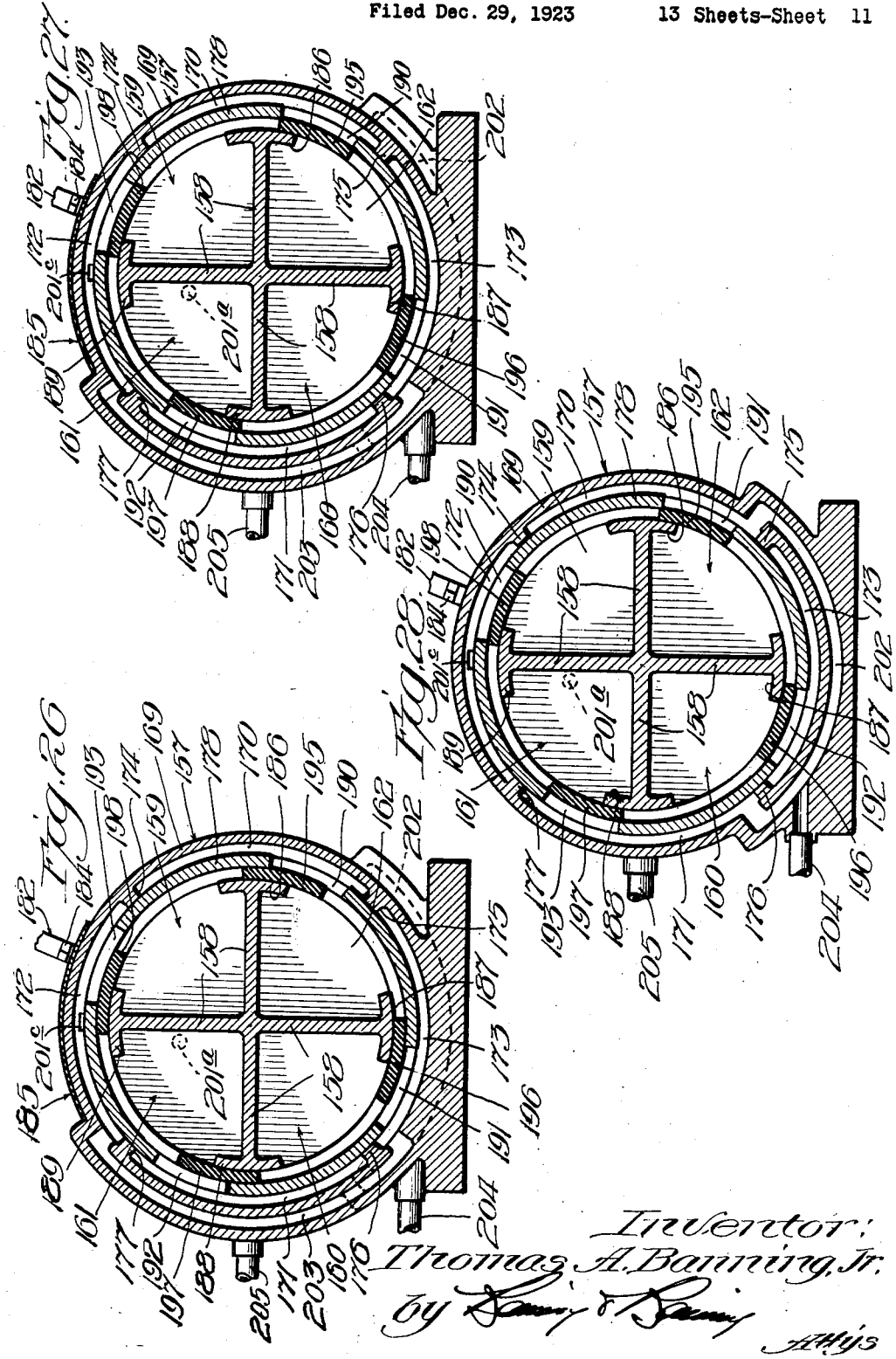

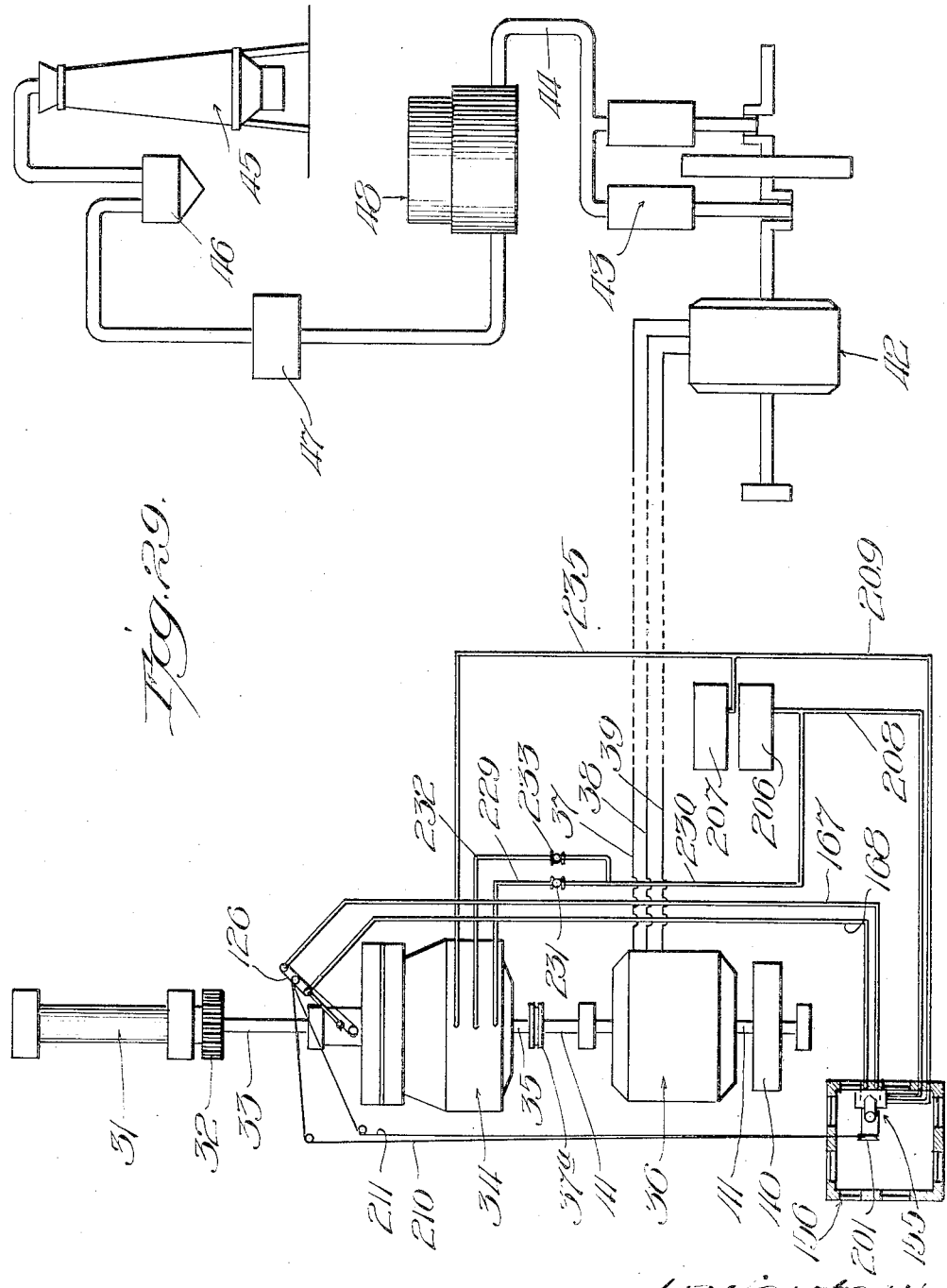

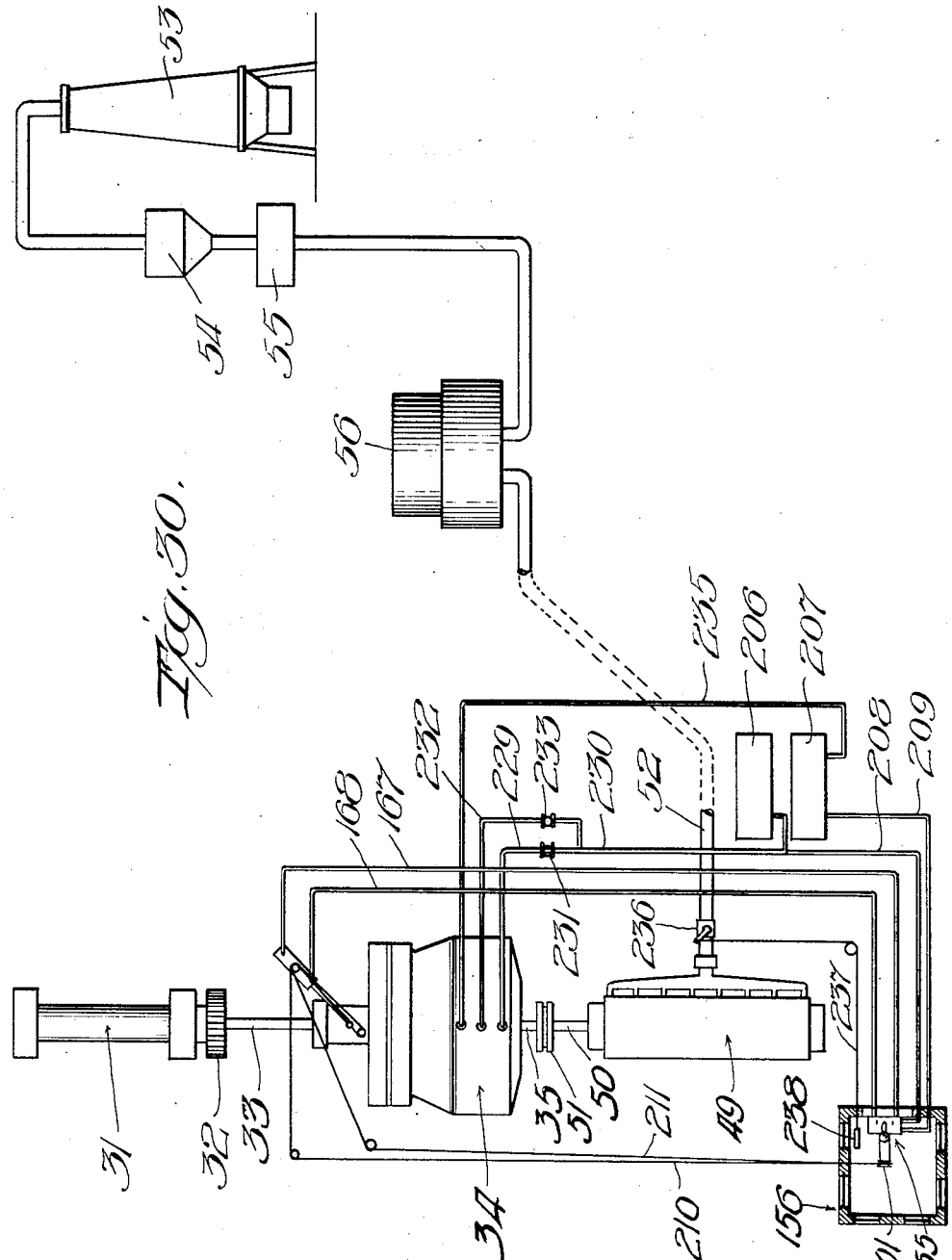

Patented Apr. 9, 1929.

1,708,409

UNITED STATES PATENT OFFICE.

THOMAS A. BANNING, JR., OF WILMETTE, ILLINOIS.

TRANSMISSION DEVICE.

Application filed December 29, 1923. Serial No. 683,334.

This invention has to do with certain improvements in driving mechanism for delivering power and controlling the operation of such power driven appliances as rolling mills, etc. It will presently appear that certain features of the invention are very well adapted for use in the driving of machinery other than rolling mills. However, inasmuch as the features of the invention are particularly well adapted for the driving and controlling of rolling mills, etc., I have herein illustrated and will describe the invention as applied to this particular usefulness. In so doing, I wish it distinctly understood that I do not intend to limit myself to this particular application of the invention or the features thereof, except as I may limit myself in the claims.

In the driving and controlling of rolling mills for steel plants and the like, it is necessary to make provision for the alternate driving of the rolls first in one direction and then in the other. The reversals of rotation must be quickly performed and under the perfect control of the "roller" who controls the unit. Furthermore, a very large amount of power and torque is needed for the operation of the rolls, the same frequently running into several thousand horse power per unit.

The large amount of power to be controlled, together with the fact that the rolls must be frequently and suddenly reversed, presents a very difficult and complicated problem from the standpoint of power transmission and control.

One object of the present invention is to provide a power transmission unit of such arrangement and construction that the control and delivery of the power to the rolls is greatly simplified, the strains on the machinery greatly reduced, and the shock of the reversal largely eliminated.

In connection with the foregoing, it is a further object of the invention to provide a transmission unit which is so arranged that the power input may be greatly stabilized so that the machinery delivering power to the transmission unit may operate at all times under a better load factor with consequent advantages of operation and the ability to carry the average load with a smaller size of power developing and transmission equipment. This will make it possible to considerably reduce the cost of the power equipment investment besides making it possible to operate the same under a more nearly constant load and, therefore, to better advantage and at higher efficiency.

Ordinarily rolling mill plants are more or less closely associated with blast furnace installations or other iron or steel producing apparatus wherein there is generated a large amount of by-product gas. This gas is, in many cases, largely or wholly available for the operation of the processes connected with the treatment and fabrication of the iron and steel itself. For example, the blast furnace gas while very lean and not satisfactory for illuminating purposes is nevertheless available for power production in large sized units.

A further feature of the invention relates to the provision of a plant layout of such arrangement that this gas may be used for the generation of the power to operate the rolling mill drive. In this connection, an object is to provide a layout which will make it possible to operate the rolling mill drive at a greatly increased efficiency as compared to previous arrangements, thus liberating a large amount of power for other useful work.

A further object in connection with the foregoing is to provide for a much more direct conversion of the power from the gas to the driving of the rolls than has heretofore been possible. This will result not only in an improved overall efficiency of the plant, but will also make it possible to largely reduce the cost and complexity of the machinery of the installation.

Another object of the invention is to provide a liquid driven unit which is particularly arranged and constructed to meet the requirements of the foregoing work, as well as the requirements of other work, and which is also of such construction as to lend itself very well to use in very large units.

In connection with the foregoing it is a further object of the invention to provide a greatly improved form of valve mechanism for the transmission unit itself, which valve mechanism will make it possible to secure considerably larger ports and passages for the flow of liquid than has heretofore been possible, and without increase in the size of the unit itself. This will make it possible to increase the efficiency and power of the unit as well as reducing the size and cost thereof.

A further object is, if desired, to make provision for cooling the liquid which is used for the transmission of power so as to avoid any possibility of overheating the same after long periods of operation under heavy load. In this connection, it is a further object to associate such cooler unit, when used, directly with the transmission unit, so that the path of travel of the liquid will be materially shortened and the efficiency and power of the unit correspondingly improved.

A further object in connection with the foregoing is to provide an auxiliary power operated mechanism for controlling the transmission unit, such auxiliary control mechanism being under the control of the roller either close by or at a distant point.

A further object, in connection with the foregoing, is to provide an arrangement such that the power for the operation of such auxiliary mechanism may be derived directly from the transmission unit itself, thus simplifying the entire installation and increasing the efficiency thereof.

A further object of the invention is to provide a remote control mechanism for controlling the operation of fluid operated mechanisms at a distant point, which remote control mechanism itself is of very simple construction, very definite and positive in its operation, and will make it possible to control the application of large forces at a distance in a positive manner by the use of a very minute amount of force at the control station.

Other objects and uses of the invention will appear from a detailed description of the same, which consists in the features of construction and combinations of parts hereinafter described and claimed.

In the drawings:

Figure 1 shows a vertical longitudinal section through a power transmission unit embodying certain of the features of the present invention, the same being devised with particular reference to the needs of a rolling mill installation or the like;

Fig. 2 shows a transverse section on the line 2—2 of Fig. 1, looking in the direction of the arrows, being a section through what I shall designate as the forward stage;

Fig. 3 is a fragmentary section on the line 3—3 of Fig. 1, looking in the direction of the arrows;

Fig. 4 is a cross section on the line 4—4 of Fig. 1, looking in the direction of the arrows; being a view through what I shall designate as the reversing stage;

Fig. 5 is a fragmentary projected section taken on the line 5—5 of Fig. 1, looking in the direction of the arrows. Fig. 5 is more or less diagrammatic and shows in a general way certain characteristics of the vanes of the impeller;

Fig. 6 shows on enlarged scale a fragmentary section of one form of sealing the clearance between the guide vane ring and the turbine, or the clearance between the turbine and the stationary casing;

Fig. 7 shows on enlarged scale a fragmentary view of one form of sealing the clearance between the impeller and the intake side of the guide vane ring;

Fig. 8 is a transverse section on the line 8—8 of Fig. 1, looking in the direction of the arrows;

Fig. 9 is a face view of the intake side of the impeller being a view on the line 9—9 of Fig. 1 looking in the direction of the arrows;

Fig. 10 is a transverse section taken on the line 10—10 of Fig. 1, looking in the direction of the arrows, showing an improved form of valve mechanism for controlling the delivery of fluid from the turbines;

Fig. 11 is a fragmentary plan view taken on the line 11—11 of Fig. 1, looking in the direction of the arrows;

Fig. 12 is a fragmentary plan view of the outside valve sleeve showing the form of the slot therein;

Fig. 13 is a fragmentary plan view of the inside valve sleeve showing the form of the slot therein;

Fig. 14 is a transverse section taken on the line 14—14 of Fig. 1, looking in the direction of the arrows, and shows the arrangement of passages for the cooler unit, when used;

Fig. 15, shows a transverse section taken on the line 15—15 of Fig. 1, looking in the direction of the arrows;

Fig. 16 shows a side elevation of the assembled machine;

Fig. 17 shows a fragmentary side view of a modified form of remote control apparatus;

Fig. 18 shows a fragmentary plan view corresponding to Fig. 17;

Fig. 19 shows a fragmentary plan view of the outside valve sleeve for the arrangement shown in Figs. 17 and 18;

Fig. 20 shows a fragmentary plan view of the inside valve sleeve for the arrangement shown in Figs. 17 and 18;

Fig. 21 shows a vertical longitudinal section through the roller's remote control valve;

Fig. 22 is a transverse section taken on the line 22—22 of Fig. 21, looking in the direction of the arrows;

Fig. 23 is a fragmentary end view taken on the line 23—23 of Fig. 21, looking in the direction of the arrows;

Fig. 24 shows a face view of the indicator plate of the remote control valve intended particularly for the preferred type of construction;

Fig. 25 shows a view similar to that of Fig. 24, with the exception that it is for the modified form of construction shown in Figs. 17, 18, 19 and 20;

Fig. 26 shows a view similar to that of Fig. 22, with the exception that the control handle has been moved to a new position, and the shield has not yet reached the cut off for such position;

Fig. 27 shows a view similar to that of Fig. 26, with the exception that the shield has reached the cut off position;

Fig. 28 shows a transverse section on the line 28—28 of Fig. 21, looking in the direction of the arrows; and the control handle valve and shield being in a position similar to that of Fig. 27;

Fig. 29 shows diagrammatically a plan layout for the application of the features of the present invention to a rolling mill drive in conjunction with a blast furnace plant, the blast furnace gases being used to generate electric power, which is then transmitted to a driving member at the position of the transmission apparatus; and Fig. 30 shows a view similar to that of Fig. 29, with the exception that the blast furnace gas after proper cleaning or other treatment is used directly for the driving of the transmission unit through the medium of a gas engine.

Referring first to Figs. 29 and 30, the stand of rolls is designated in each case by the numeral 31. The rolls of the stand are connected together by suitable end gears 32, and a driving shaft 33 is provided for driving the stand.

The transmission unit which constitutes one of the features of the invention is designated in its entirety in each case by the numeral 34. The transmission unit has the driving shaft 35 which is driven by the prime mover or other source of power at either constant or variable speed. The driven end of the transmission unit includes a shaft in line with the shaft 35. This may be either the shaft 33, which leads directly to the stand of rolls, or another shaft coupled thereto.

In the arrangement of Fig. 29 the driving shaft 35 is connected to the shaft of an electric motor 36 by means of a coupling 37ᵃ. Said electric motor may be of any convenient or desirable type and construction, but for purposes of convenience in illustration I have shown the same as being a three phase alternating current motor having the incoming lines 37, 38 and 39. In some cases the motor, when of the alternating type will be an induction motor and in other cases a synchronous motor.

I have also illustrated a fly wheel 40 on the motor shaft 41 so as to stabilize the operation of the same and compensate for varying power demands. This fly wheel will serve to largely equalize the power input necessary to operate the layout.

When the transmission unit is driven by an electric motor as in the arrangement illustrated in Fig. 29, the current therefor may be derived from any suitable source, either external to the plant, or from a power station in the plant itself. Such power station may include an electric generator 42 driven by a gas engine 43 receiving blast furnace gas through the line 44. This blast furnace gas is derived from the blast furnace 45 and passes through the dust catcher 46, suitable cleaning apparatus 47, including by-product recovery apparatus if desired, and a gasometer 48. In the arrangement shown diagrammatically in Fig. 30, the transmission driving shaft 35 is driven by means of a gas engine 49 whose shaft 50 is coupled to the driving shaft 35 by a coupling 51. This gas engine receives its gas over a line 52 from any suitable source. In the arrangement illustrated such source is the blast furnace 53 whose gas is passed through the dust catcher 54, suitable cleaning and by-product recovery apparatus 55 and the gasometer 56.

Referring now to Fig. 1 in particular, the transmission unit itself includes the driving shaft 35 and the driven shaft 33 previously referred to. These shafts are in line with each other and at the point where they come together they are held in proper alignment by a ball or other suitable bearing 57.

Mounted upon the driving shaft 35 is the centrifugal pump unit 58. This unit is splined to the driving shaft 35, so that it can be shifted back and forth along said shaft within the proper limits of movement, but maintains its driving connection at all times. For this purpose, the driving shaft 35 is slotted as shown at 59 to receive the block 60. This key block, as shown in Fig. 3, has its edge portions 61 reaching beyond the surface of the shaft 35 to establish a keyed connection to the pump. The block 60 is held against longitudinal displacement from the pump by a pair of pins 62 which reach through the block and into the pump, said pins being originally introduced through an opening 63 in the end of the block.

The pump can be shifted back and forth on the driving shaft by means of a control rod 64 which reaches centrally through the two aligned shafts and past the bearing 57. One end of this rod 64 is secured to the block 60 by means of nuts 65. Consequently, by moving the rod 64 back and forth the pump is shifted.

The driven shaft 33 is also slotted as shown at 66, and receives a transverse block 67 whose end portions reach beyond the surface of the shaft. The end of the rod 64 is journaled in the block 67, as shown at 68, so that the block and rod can rotate at different speeds.

A collar is placed on the shaft 33 outside of the position of the block 67. This collar includes a flanged member 69 together with a ring 70 adjacent thereto. The flange portion of the collar is upset as set at 71 so as to hold the ring in place. This arrangement, therefore, constitutes a collar having a central circular groove which receives the ends of the block 67.

By shifting the collar back and forth the position of the pump is controlled. For this purpose the collar has at one side an upstanding lug 72, the upper end of which is controlled in the desired manner.

Surrounding the position of the impeller is a stationary guide vane ring designated 73 in its entirety. This guide vane ring is barrel shaped and the impeller can be shifted back and forth within the same freely.

The impeller has its intake opening 74 facing axially towards the position of the driven shaft and has its discharge openings 75 facing outwards at its periphery. The liquid enters the impeller in an axial direction and is discharged at the periphery.

The guide vane ring has a central or neutral position 76, and forward and reversing positions 77 and 78 respectively. The forward and reversing sections are provided with outwardly curving guide vanes 79 and 80 for the forward and reversing sections respectively.

When the impeller stands at the neutral position 76 its discharge openings are effectively sealed against delivery of liquid (except for the purpose of storing a relatively small volume of liquid under pressure). By shifting the impeller in the one direction or the other its discharge openings are brought into registry with either the forward drive or reversing sets of guide vanes. The passages between the sets of guide vanes are respectively of proper size to easily transfer the full volume of liquid delivered by the impeller when the full registry of the impeller with the passages is brought about.

Surrounding the guide vane ring is a turbine unit designated in its entirety by the numeral 79$^a$. The same includes forward and reversing turbine sections 80$^a$ and 81$^a$ respectively, said sections lying in registry with the passages of the corresponding guide vane ring sections.

The forward turbine has the driving vanes 81 and the reversing turbine has the driving vanes 82. The form and general relationship between the two sets of vanes is clearly illustrated in Figs. 2 and 4. The direction of impeller rotation is in each instance shown by the arrow head. As the liquid is discharged from the impeller it has a velocity which includes both radial and tangential components of movement. The guide vanes 79 of the forward driving section curve outwardly and forwardly in the general direction of pump rotation. The forward driving turbine vanes 81 are dished backwardly against the direction of liquid discharged from the guide vane ring so as to take up the proper reaction and create the desired forward driving force.

The guide vanes 80 for the reversing section are curved backwardly so as to pick up the liquid delivered by the pump and discharge it in a backwardly traveling direction. The reversing turbine vanes 82 are dished against the direction of liquid discharged from the guide vanes 80 so as to create the desired reversing force.

It will be observed in each case the velocity energy of the liquid discharged by the pump is very largely conserved and delivered to the proper turbine section. For this reason the combined overall efficiency of the combination is high and is much higher than would be the case with the centrifugal pump and reaction turbine separated from each other or not related in such a way as to allow of a direct transfer of kinetic energy.

Surrounding the parts is a casing 83. This casing is of generally barrel shape. It includes the heads 84 and 85 located at the driving and driven ends respectively. It also includes an annular passage 86 surrounding the position of the forward drive turbine and another annular passage 87 surrounding the position of the reversing turbine, as well as other longitudinally extending passages to be presently described. The passages 86 and 87 surround the forward and reversing turbines respectively and are intended to receive all of the liquid delivered from the turbines when they are in operation. These passages are also isolated from each other so as to prevent a cross flow of liquid between the two turbine sections.

The guide vane ring is carried by a flange 88 which has the shoulder 89 around its central portion. The head 84 is secured rigid with respect to the central or hub portion of the flange 88, so that the guide vane ring is held rigidly in place.

A ball or rolling bearing 90 is placed between the guide vane ring flange 88 and the outer end of the driving shaft 35. A flange 91 is secured to one end of the turbine unit and reaches inwardly to a point adjacent to the shoulder 89. A ball or roller bearing 92 is placed between the flange and said shoulder and carries the turbine unit at that end.

A quill 93 is secured to the other end of the turbine unit and extends down to direct connection with the driven shaft 33, as clearly shown in Fig. 1. This quill 93 comprises a plurality of separated arms, so that the liquid can flow freely between them in returning to the impeller.

A series of arms 94 are provided at the driven shaft end of the casing, said arms reaching inwardly towards the driven shaft and taking a bearing thereon by the ball or roller bearing 95. These arms 94 are also well separated from each other so as to allow a free return of the liquid to the pump.

Reaching lengthwise of the casing is a series of passages 96 whose open ends communicate directly with the annular forward drive turbine passage 86. These passages 96 are, however, of only approximately one-half the radial dimension of the passage 86 and are separated from each other a substantial distance, is illustrated in Fig. 2. These passages 96 so separated lead towards the driven end of the casing where their inner ends are turned inwardly towards the shaft, as shown in Fig. 1.

The passages 96 just referred to reach past the annular reversing turbine passage 87 with which they do not communicate as is clearly illustrated in Fig. 1.

Intermediate between the forward turbine passages 96 are the reversing turbine passages 97. These have their open ends in communication with the reversing turbine annular passage 87 and they extend lengthwise of the casing and have their discharge ends turned inwardly towards the driven shaft, as clearly shown in Fig. 1.

The reversing turbine passages 97 are of substantially the full radial dimension of the corresponding annular passage 87; but examination of Fig. 4 shows that they are of smaller angular dimension than the forward turbine passages 96. The two groups of passages are so related that they are of substantially the same cross sectional area.

The discharge ends of all of the passages of both groups are located around a cylindrical surface, as clearly shown in Fig. 10, and they all face towards the shaft. Suitable valve mechanism is provided for controlling the delivery of liquid from these passages to thereby control the delivery from the two turbine sections. In the particular arrangement illustrated, this valve mechanism takes the form of a pair of cylindrical valves 98 and 99 which work freely within each other and adjacent to the discharge ends of the passages 96 and 97. The cylindrical valve 98 is carried by a web having the arms 100 which in turn are carried by an axially extending valve sleeve 101. In like manner the valve 99 is carried by a series of arms 102 which are in turn carried by an axially extending valve sleeve 103. Consequently, by turning the valve sleeves the two valves may be individually or jointly controlled.

The valve 98 has the ports 104 so spaced as to correspond to alternate longitudinally extending passages but is fully sealed between said ports; and the valve 99 has ports 105 so spaced as to correspond to the intermediate longitudinally extending passages and to seal the others.

The ports of the two valve members are furthermore so related that when the valve members stand in the neutral position they overlap slightly and thus completely seal all of the passages of both sets.

The valve member 98 normally seals the forward turbine passages 96, and the valve 99 normally seals the reverse turbine passages 97. I shall, therefore, designate the valve 98 as the forward valve and the valve 99 as the reverse valve for purposes of convenience.

When the forward valve is rotated in either direction away from the position illustrated in Fig. 10, (the reverse valve 99 remaining in the neutral position of said figure), the forward turbine passages 96 are opened a greater or less extent depending upon the amount of such valve movement; whereas when the reverse valve 99 is moved in either direction away from the position shown in Fig. 10, (the forward valve remaining in the neutral position of said figure), the reverse turbine passages 97 will be opened a greater or less extent depending upon the valve movement.

I have provided means for properly controlling the valve movements, and in this connection, such controlling means may also be properly co-ordinated with the movements of the pump.

In the particular arrangement illustrated the pin 72 on the control collar 69, which moves the pump back and forth, passes up through a slot 106 of the reversing valve sleeve 103 and through another slot 107 of the forward valve sleeve 101. In order to make the operations easier a roller 108ª is placed on the pin 72 at the point where it passes through these slots. The slot 106 of the reversing valve sleeve is straight throughout its length, but is provided with a notch 108 at its direct drive end; and the slot 107 of the forward valve sleeve is straight throughout its length, but is provided with a notch 109 at its reversing position.

The normal movements of the pin 72 and roller 108ª are straight back and forth for a distance sufficient to move the pump between the full forward drive and the full reversing positions. On account of the shapes of the slots 106 and 107 there will be no valve movement during this full amount of pump movement, so that both the forward and reversing valve passages will remain fully closed.

When the forward drive pump position is reached the pin 72 may be turned towards the left, when looking in the direction of Fig. 10, which will cause the forward drive valve to be opened, and will leave the reversing valve in its closed position, owing to the presence of the notch 108. Upon turning the pin 72 back to its initial position, the forward turbine valve will be again closed. In like manner when the pin 72 stands at the position where the pump is effective for full reverse operation, the reverse valve will also be closed, but by then turning the pin towards the right when looking in the direction of Fig. 10, the reversing valve will be turned so as to open the reversing turbine passages, but the forward valve will remain closed owing to the presence of the notch 109.

It is thus possible to first shift the pump the full amount of movement in either direction and then open the corresponding valve a greater or less extent as desired, so that the effective driving force can be very perfectly controlled.

The movements of the pin 72 may be brought about in any convenient manner, but they are usually controlled by the presence of a suitable slot in the casing itself.

Reaching in the direction of the driven shaft is a neck 110 on the casing. At its outer end this neck carries a ball or roller bearing 111 which serves as an extension bearing for the driven shaft 33. In the particular arrangement illustrated a spacer block 112 is placed between the neck 110 and the bearing.

On its top side the neck 110 is provided with a slot 113 whose form is illustrated in Fig. 11. This slot has at its forward drive end a notch 114 corresponding to the notch 108 of the reversing valve sleeve, and has at its reversing end a slot 115 corresponding to the slot 109 of the forward drive valve sleeve. The pin 72 is thus compelled to travel a straight line across the full distance required for shifting the pump, but at its extremes of movements is allowed to be turned in the proper direction for proper valve control. It thus becomes impossible to perform an erroneous valve movement in the normal operation of the machine.

In those cases in which there is no provision made for cooling the liquid, the liquid, as delivered from the valve ports, will return directly past the arms 94 and quill 93 to the intake side of the pump. In the present case, however, I have provided a cooler whose operation I will now describe more in detail.

This cooler includes the head member 85 having an intake manifold 116 across its upper end and return manifold 117 across its lower end. These manifolds are joined together by suitable cooler pipes 118 and 119 which may be of relatively thin metal of good heat conductivity, such as thin sheet copper. They may also be corrugated, if desired, in order to increase the amount of heat dissipating capacity.

An arcuate partition 120 partially encircles the casing sleeve 110 at a point sufficiently removed therefrom to establish an annular discharge passage 121. An arcuate cooler inlet passage 122 partially surrounds the discharge passage 121, as clearly shown in Fig. 14. The upper central portion of the passage 122 communicates directly with the central portion of the cooler inlet manifold 116, and the central portion of the cooler discharge manifold 117 communicates with the discharge passage 121. For this purpose, it reaches upwardly between the lower ends of the passage 122, as shown at 123 in Fig. 14.

The inner valve member 99 (which happens to be the reversing valve in the present case, although not necessarily so) is provided with a curved deflector 124ª which reaches in the direction of the cooler inlet passage 122 with which it communicates, as clearly evident from Figs. 1 and 14. This deflector plate 124ª thus serves to trap all of the liquid coming through the valve ports and to throw it endwise into the passage 122. For this purpose the separation of the arms 100 of the forward valve 98 serves to establish the necessary openings throughout the major portion of the circle.

Examination of Figs. 1 and 14, however, shows the presence of a segmental plate 124 in that portion of the forward valve member 98, which comes opposite to the passage 123, previously referred to. This plate 124 is of sufficient angular dimension to prevent direct communication between the inlet and outlet passages of the cooler for any amount of normal movement of the forward valve 98. For this purpose it will be observed that in Fig. 14 the plate 124 reaches a substantial distance beyond the lower right hand corner of the cooler inlet passage 122, but this does not interfere with a free flow of liquid from the deflector plate into said cooler inlet passage.

Examination of Figs. 10 and 14 shows that when the valves stand in the normal or closed position the arms 100 for the forward valve 98 are not in line with the arms 102 of the reversing valve 99. Comparison of the various parts will show, however, that when the forward valve is turned towards the left in its opening movement (the reverse valve remaining stationary) the arms 100 are carried into registry with the arms 102. Such examination will also show that when the reversing valve 99 is turned towards the right in Fig. 10 for its opening movement (the forward valve 98 remaining stationary) the arms 102 are carried into registry with the arms 100. It thus appears that in either case when the valve is opened for either forward or reverse drive the pairs of arms are in register and thus create a minimum amount of obstruction to the flow of the liquid.

Owing to the fact that the normal thermal tendency for the flow of the liquid is downwards through the cooler, it follows that the arrangement herein disclosed is such that the cooling action in itself tends to assist the movement of the liquid through the system.

As previously stated any suitable means may be provided for moving the pin 72 in order to control the position of the pump and valves. Owing, however, to the relatively large size of the units contemplated herein, I have made provision for the power actuation of this pin. Such mechanism includes a suitable cylinder together with a plunger therein which is connected to the pin, so that by controlling the delivery of liquid under pressure to the opposite sides of this plunger the desired movements are secured.

In the preferred construction illustrated in Figs. 11 and 16 there is provided a cylinder 126 whose plunger has the piston rod 127. This piston rod is connected by a link 128 with the pin 72 through the medium of a ball and socket joint 129. A pivotal connection 130 is also established at the point where the piston rod 127 and link 128 are brought together. The cylinder 126 is carried by a bracket 131 and the cylinder reaches outwardly from the frame of the machine at an angle of substantially 45°· and the cylinder is pivoted to said bracket by a pivotal connection 132, as clearly shown in Figs. 11 and 16. The result of this arrangement is that by forcing the piston back and forth the pin 72 may be caused to travel the full length of the slot 113 and also may be caused to turn angularly at the ends of said slot. For example, when the piston rod is forced outwardly from the position shown in Fig 11, the pin will be caused to travel towards the left, and when it reaches the extreme limit of such movement, it will turn over into the notch 114 so as to control the valve. Similarly by drawing the piston rod 127 into the cylinder the pin will be drawn towards the right in Fig. 11 to bring about the full movement of the pump, and thereafter the pin will ride into the notch 115 so as to cause the proper valve movement. It is also possible with this arrangement to secure the exact amount of valve opening desired in either instance because after the pump has been shifted the valve movement takes place as a separate or independent function requiring a considerable amount of piston movement.

In the modified construction shown in Figs. 17, 18, 19 and 20, provision is only made for a direct back and forth movement of the pin 72, such movement being dictated by the fact that the slot 133 of the casing is straight throughout its entire length. The slot 134 of the forward valve sleeve 101 is straight between its neutral position and the extreme right hand position of Fig. 19, but is curved as shown at 135 in Fig. 19, so that during the movement of the pin 72 towards the left, the forward valve sleeve is turned.

On the other hand the reversing valve sleeve 103 of Fig. 20 has its left hand portion 136 straight between the neutral position and the extreme left limit of movement, whereas its other end 137 is curved in a direction contrary to that of the forward valve sleeve. Consequently, when moving the pin 72 towards the right in Fig. 20, the reversing valve sleeve is turned in the proper direction, but the forward valve sleeve is not turned.

For actuating the mechanism by power with the modified arrangement of Figs. 17, 18, 19 and 20, I have illustrated the cylinder 138 within which there is a plunger having the piston rod 139. This piston rod is directly connected to the upper end of the pin 72 and no ball and socket joint is necessary in the present construction. Furthermore, in the present case the cylinder may be rigidly secured to the frame of the machine.

The guide vane ring flange 88 is provided with one or more perforations 140, and the turbine flange 91 is provided with one or more perforations 141. These allow liquid to move freely from the back face of the pump unit, when it is moved its extreme distance, towards the left in Fig. 1.

It will be understood that the centrifugal forces generated by the rotation of the pumping and turbine units create pressures towards the outside of the machine, but that no pressure is generated along the axis of the machine, except the slight hydrostatic pressure due to the height of the liquid above the position of the shaft. This will not in any case exceed a few pounds per square inch. Consequently, the tendency for the seepage of liquid will be very slight. In order, however, to effectively seal against any such seepage, I have illustrated a sealing washer 142 at the outside face of the ball bearing 90 and another sealing washer 143 at the outside face of the ball bearing 95. Any slight amount of liquid seeping past the washer 143 will be trapped in the extension 110 of the casing. I have, therefore, provided another sealing washer 144 at the outside face of the bearing 111 to prevent movement of liquid out along the driven shaft 33.

In many cases it will be possible to establish a sufficiently accurate fit between the peripheral discharge side of the pump unit and the inlet side of the guide vane ring to prevent any material leakage of the liquid under pressure. In like manner a sufficiently accurate fit may be provided between the outside face of the guide vane ring and the inside inlet face of the turbine to prevent such leakage, and also a sufficiently accurate fit between the outside discharge face of the turbine unit and the inside face of the casing. In some cases, however, owing to the relatively large size of the machine and the relatively large dimensions of the parts, it will not be feasible to establish the necessary close fit in order to effectively prevent such leakage and at the same time provide for the necessary expansion and contraction with change of temperature. I have, therefore, made provision for sealing the parts notwithstanding their relatively large size. For this purpose, in Fig. 7 I have illustrated a leather or other similar band 145 seated in a suitable socket 146 around the periphery of the pump unit at each side of the discharge openings thereof. These bands are of proper size to fit easily against the inside face of the guide vane ring, and owing to the nature of the material of which they are made, they are capable of a slight amount of yielding or flexure so as to prevent jamming of the parts. Ordinarily when made of leather very slight clearance will be established between these rings 145 and the guide vane ring, since the leather itself will have a tendency to expand slightly with the impregnation of such liquids as oils which may be used for the operation of the machine.

In order to effectively retain the rings 145 in place, I have illustrated the wires 147 which are embedded in them and completely encircle the pumping unit and serve to take up the strains created in the bands 145 by the centrifugal action. These wires 147 are preferably of high tensile material such as alloy steel or phosphor bronze.

The arrangement thus disclosed will permit the necessary back and forth movements of the pump unit to be performed without interference of the rings 145 on the surface of the guide vane ring.

In the case of the clearance between the turbine and the guide vane ring on the one hand and the casing on the other hand the construction illustrated in Fig. 6 may be used. For this purpose the turbine and the companion units are provided with annular grooves 148 and 149 which face each other. Within these grooves are placed the circular cup shaped washers 150 and 151 which are cupped in opposite directions around the circle. The central lines of these cupped shaped washers are preferably joined together by rivets such as 152. With this arrangement hydrostatic pressure coming from the left in Fig. 6 will be allowed to seep past the washer 151, but will accumulate against the back surface of the washer 150 and cause it to seat firmly against the right hand walls of the grooves 148 and 149. In this way, the seepage of liquid towards the right will be prevented. A contrary action will take place when the hydrostatic pressure is exerted from the right hand side.

The construction illustrated in Fig. 6 is very well adapted for sealing between the parts while at the same time allowing them to perform their necessary relative rotations. In this connection it will be remembered that it is not necessary to make provision for axially shifting of the turbine unit with respect to the casing or guide vane ring, except such very small movement as may take place within the bearings during rotation.

Since the centrifugal pump is a one way pump, it will practically be subjected to a considerable amount of reaction in the direction parallel to the shaft, said reaction being generally proportional to the amount of power being momentarily delivered in the liquid delivered at its periphery. Such being the case suitable provision should be made to retain the pump at whatever position is desired on the driving shaft. This can be done either by holding the collar 69 by means of the pin 72, or in any other convenient manner.

In the present case I have made provision for compensating the reaction tendency within the pump itself. This is done by providing a propeller action in conjunction with the pump, the propeller action serving to neutralize the natural reaction of the pump.

This propeller action is secured by placing what amounts to a propeller on the driving shaft at a point in advance of the pump, which propeller is so designed that it exerts a pull in a direction contrary to the direction of pump reaction. This pull is at all times equal and opposite to the reaction of the pump itself, and thus holds the pump against any tendency to shift.

In the particular arrangement illustrated, this propeller action is secured by carrying the intake ends 153 of the pump vanes 154 forwardly as shown diagrammatically in Fig. 5. The direction of rotation is shown by the arrow head in said figure. By reason of this construction the front ends of the impeller blades constitute in effect a propeller, and develop a propeller action as they receive the inflowing current of liquid.

I will now explain in detail the remote control mechanism which I have disclosed herein for operating the plunger within the auxiliary cylinder 126 or 138, as the case may be.

Reference to the diagrams of Figs. 29 and 30 shows a control handle 155 located in the roller's stand 156. This control handle and valve is shown in detail in Figs. 21 to 28 to which reference may be had.

The control valve includes a generally circular casing 157 having the transverse partitions 158 which serve to establish quadrangle chambers 159, 160, 161 and 162. These chambers are connected together in diagonally opposite pairs by the cross passages 163 and 164 as shown in the fragmentary end view of Fig. 23. The connections 165 and 166 serve to give communication to the pairs of chambers 159—160 and 161—162 respectively. The connections 165 and 166 are connected to the ends of the cylinder by the pipes 167 and 168. In those cases in which the cylinder itself undergoes a certain amount of movement, as is the case with the pivoted cylinder 126 the pipes 167 and 168 will be provided with suitable flexible connections adjacent to the cylinder or may be made of flexible pipe or hose.

The casing 157 is also provided with an encircling wall 169 separated some distance from the chambers 159—160, and 161—162, so as to establish the chambers 170, 171, 172 and 173. These last are also of quadrant form, but are offset from the partitions, so that the chambers 170, 171, 172 and 173 reach to both sides of the partitions, as clearly evident from Fig. 22. The partitions 174, 175, 176 and 177 which serve to define the chambers 170, 171, 172 and 173 reach inwards a sufficient distance to engage a barrel shaped valve member 178. This valve member is carried by a flange 179 which reaches inwardly to a collar 180. Said collar passes out of the casing through a stuffing box 181. A control handle 182 conveniently placed with respect to the casing is connected to the collar 180 by a lever 183. Said control handle has a pointer 184 working over a suitable scale 185 on the top of the casing and in position for convenient view by the roller.

At the outer ends of the respective partitions 158 are the segmental fins 186, 187, 188 and 189. The valve 178 is provided with ports 190, 191, 192 and 193 of angular dimension substantially the same as these fins.

Lying between the barrel shaped valve member and the fins aforesaid is a shield 194 having the guards 195, 196, 197 and 198 corresponding to the fins and valve ports. This shield member 194 is carried by a flange 199 which reaches inwardly and is provided with a rock shaft 200 reaching out through the sleeve 180. A spindle 201 is located on the outer end of the rock shaft 200. Each of the guards aforesaid is of substantially the same angular dimension as the valve ports and fins to which it lies adjacent, and is preferably of slightly greater dimension so as to insure a very small overlap.

The chambers 170 and 171 are connected together by a passage 202 reaching around through the outside wall of the casing, and in like manner the chambers 172 and 173 are connected together by another passage 203 which reaches around through the outside wall of the casing, but does not communicate with the passage 202. The passages 202 and 203 are provided with the connections 204 and 205 respectively.

In the operation of the device one of the connections 204 and 205 is connected to a source of liquid under pressure, and the other of said connections is connected to the return side or discharge side of the system. In the arrangement shown diagrammatically in Figs. 29 and 30 there are provided the pressure and surge tanks 206 and 207, the former carrying a supply of liquid under pressure, and the other serving to receive the liquid whose pressure has been exhausted. Connections from the chambers 206 and 207 are effected to the connections 204 and 205 respectively by means of the pipes 208 and 209. Consequently, the valve chambers 170 and 171 are subjected to liquid under pressure, whereas the chambers 172 and 173 are connected to the discharge side of the system. The spindle 201 is connected to the piston rod or plunger by means of cords 210 and 211 which work over suitable pulleys and are connected in opposite directions to the pin 212 of the cylinder 126, or 213 of the cylinder 138, as the case may be. In the case of a construction using a stationary cylinder the pulleys over which the cords pass may be carried by stationary parts, since the direction of travel of the piston does not change. However, in case of a cylinder whose direction changes owing to its pivotal mounting, it is necessary to make special provision for guiding the cords adjacent to the cylinder. For this reason I have shown a post 214 reaching upwards from the cylinder at a point substantially above the pivotal point 132, and have also shown a bracket arm 215 reaching outwardly from the cylinder to which it is secured, to a point sufficiently removed, so that the complete back and forth travel of the pin 212 can take place and still insure a proper travel of the cords over the pulley 216 carried by its bracket arm.

The cords pass over pulleys 217 and 218 carried by the stand 214, so that at the point where the cords approach the pin 212 they pass over pulleys whose position does not change with respect to the pivotal point 132.

The back and forth movement of the plunger thus cause the shield 194 to turn in the one direction or the other, and the amount of such turning is exactly proportional to the amount of piston movement. It is intended that the parts shall be so adjusted that when the control handle 182 and valve 178 stand at the neutral position where the ports are directly opposite to the fins, the shield shall also stand with its guards directly under the ports, and the piston shall stand at the neutral position in the cylinder.

Assuming that the control handle 182 is turned in the reversing direction to the position shown in Fig. 26, the ports 190 and 192 will be moved beyond the guards and into communication with the chambers 161 and 162. These chambers will therefore be subjected to the full pressure of the liquid coming from the source of supply. This pressure will thus be communicated directly through the connection 166 to the proper side of the plunger to force the same in the proper direction to move the pump towards the reversing position.

As soon as this condition exists the plunger will commence traveling in such direction, and the shield will be rotated accordingly and will thus approach the valve ports and tend to close them again. As soon as the piston has reached a position corresponding to the position of the control handle the shield will again seal off the ports and thus prevent any further delivery of liquid under pressure. This piston movement will then cease and the piston will be held at such position.

At the same time that the valve ports 190 and 192 are in communication with the chambers 161 and 162 the valve ports 191 and 193 are in communication with the chambers 159 and 160, thus placing said chambers in communication with the chambers 172 and 173 which in turn are connected to the return or no pressure side of the system. Since the chambers 159 and 160 are in turn connected to the opposite end of the cylinder it follows that the liquid was allowed to discharge from said end of the cylinder simultaneously with the piston movement.

Examination of the arrangement will show that in case of a further movement of the control handle the valves will all be opened in the proper manner to allow a proportional further travel of the piston, and then to prevent any further travel; and will also show that in case of a movement of a control handle in the backward direction, the proper connections will be established to cause a proportionate backward movement of the piston.

It thus follows that I have made provision for a remote control of the piston movements, and have secured the piston movements by the use of liquid under pressure, and also have so arranged the parts that the piston will in every case assume a new position exactly according to the new position of the control handle. The roller thus has assurance that the mechanism of the transmission device is perfectly responding to the movements of his control handle.

The indicator plate 185, previously referred to, may be provided with suitable markings with which the pointer 184 may be compared. These may include a neutral position mark 219, a full forward position mark 220, and a full reverse position mark 221. Suitable other marks may be provided intermediate of the aforesaid marks to indicate proportional movements of the pump and valve mechanism. In the preferred arrangement the pump completes its movement before the valve is opened. I have shown in the scale of Fig. 24 other marks 222 and 223 designating respectively the control handle positions corresponding to the full pump movements, and other marks 224 and 225 intermediate between the marks 222 and 220, and between the marks 223 and 221 respectively for showing partial valve movements.

The liquid under pressure may be derived from any suitable source. In the present case I have provided for securing the same by the use of the impeller of the main transmission unit. For this purpose I have shown an annular passage 226 reaching around the guide vane ring at the neutral position, so that whenever the impeller stands at or passes the neutral position it will receive the full pressure of the liquid at the time being generated by the pump rotation. A passage 227 reaches from the passage 226 across the forward section of the guide vane ring, and down through the flange 88. A pipe 228 then connects with the passage 227 and reaches the pressure tank through the pipes 229 and 230. A check valve 231 may be provided in the pipe 229 to prevent a back flow of liquid.

It will be observed that when the turbine is rotating there may also exist a hydrostatic pressure at its periphery. In some cases this may be of substantial amount and may exceed the pressure generated by the pump or pressure existing within the tank. I have, therefore, provided another pipe 232 reaching from the annular passage 86 to the pipe 230, there being a check valve 233 in the pipe 232 to prevent any back flow through the same.

With this arrangement the tank 206 will also be supplied with liquid under pressure, and whichever pressure is higher will fix the amount of this tank pressure.

It is desired to keep the casing of the transmission unit at all times filled with liquid. In order to compensate for expansion and contraction due to change of temperature, and also to allow for admission of liquid into the casing to compensate for any liquid withdrawn therefrom, I have provided a connection 234 reaching through the casing into communication with its interior at a point where the liquid may return directly to the inlet side of the pump. A pipe 235 reaches between the connection 234 and the surge tank 207. With this arrangement the surge tank will take care of changes of volume due to expansion and contraction as well as allowing for the return flow of liquid due to the operation of the remote control mechanism. Ordinarily the surge tank should be placed at an elevation slightly above that of the transmission device itself.

There may be a slight amount of seepage of liquid between the valve member, the guard member, and the casing. Any liquid seeping through would tend to accumulate between the flanges 179 and 199 and the walls of the casing. In order to relieve any back pressure thus undesirably created, I have illustrated the drain openings 201$^a$ and 201$^b$ in the flanges, and the drain opening 201$^c$ in the casing. The opening 201$^c$ reaches from the back side of the flange 179 to the space 172 which is intended to be connected to the discharge or low pressure side of the valve. By allowing for this release of back pressure the end thrusts on the valve and guard members are done away with, and furthermore the tendency for oil leakage past the stuffing box 181 is also eliminated.

The pumping unit can be driven either at substantially constant speed, or at a variable speed as desired. In some cases it will be desirable to use a fairly constant speed drive whereas in other cases a considerable variation of speed may be desirable. When using a variable speed drive the pumping unit can be driven at low speed while standing at or passing through the neutral position to either the forward or reversing position, and then its speed can be increased to whatever point is necessary to generate the desired pumping action and consequent driving force on the turbine. On the other hand in some cases it will be desirable to use a largely constant speed drive and to regulate the driving force of the turbine largely by regulation of the valve opening.

When driving the pumping unit by the use of a gas engine, as diagrammatically shown in Fig. 30, a control valve 236 may be placed in the gas line 52, the same being connected by means of a cord 237 with the accelerator pedal 238 in the roller's stand 156. In such case the engine valve should be so adjusted that the engine will idle at the proper low speed when the accelerator pedal is released.

When an electric motor drive is used, as shown for example in Fig. 29, the same preferably operates at substantially constant speed. An induction motor will operate at a fairly constant speed but the slip will, of course, increase as the load comes on. By using a sufficient amount of fly wheel action the amount of energy stored up therein will supply the initial requirements of reversing the direction of rotation of the rolls, so that the load on the transmission line can be made fairly constant. In this way the entire power generating and transmitting equipment can be operated to the best advantage.

This fly wheel action can be supplied either by the fly wheel 40 or by the pumping unit itself. In the present case I have illustrated the pumping unit as having a relatively massive flange 239 in its periphery so as to develop a very considerable fly wheel action in the pump itself.

Any suitable liquid can be used for operating this system such as water or oil. When oil is used it will, of course, supply the desired lubrication of all of the moving parts and will insure a very advantageous operation from this standpoint.

It is noted that in the particular construction illustrated the reversing turbine is placed closer to the valve than the forward driving turbine. Consequently, the length of travel of liquid used for forward driving is slightly greater than the travel of the liquid used for reverse driving. This will cause a slight lowering of efficiency during forward drive due to this cause.

On the other hand, when driving forward the liquid discharged by the pump maintains the same rotary direction of travel in the turbine, whereas when driving reverse the direction of the liquid must first be reversed in the guide vane ring, although, theoretically without loss of energy. There will probably be a slight loss of energy in reversing the liquid in the guide vane ring, which loss is peculiar to the reversing operation, but does not take place when driving forward.

It thus appears that the overall efficiency of the transmission unit is substantially the same when driving reverse as when driving forward, and this result is made possible by placing the forward turbine section at a greater distance from the position of the valve.

This equalization of efficiency is an important feature in transmission units intended for such uses as driving rolling mills, etc., since the rolls thereof are driven substantially an equal amount and at substantially equal loads in both directions.

In case of the seepage of any liquid between the periphery of the impeller and the inlet side of the guide vane ring, or between the discharge side of the guide vane ring and the inlet side of the turbine, or between the discharge side of the turbine and the inside of the casing, a portion of this liquid may find its way directly towards the driven end of the transmission unit, and thus find its way directly to the inlet side of the impeller. Any liquid seeping in the opposite direction would tend to build up a back pressure against the flange 91 or the back face of the impeller, and for these reasons may exercise an objectionable effect. In order to relieve such back pressure at the driving end of the machine I have provided a connection 240 leading through the casing head 84. The connection 240 can be connected to the pipe 235, or in any other way, to the inlet side of the impeller, so as to equalize the pressure at both ends of the machine. This will avoid the accumulation of back pressures.

The guide vane ring and turbine units may be constructed in any convenient manner. Each may be made as an integral unit or a built up construction may be used.

In the drawings I have illustrated a built up construction. The turbine unit is shown as being made of a pair of end plates, together with a central ring section, these members being suitably slotted on their opposing faces so as to receive the turbine blades. All of the sections are then drawn together by the through bolts 241. In like manner the guide vane ring is shown as being built up from end rings and an intermediate ring, together with the blades of the guide vane ring, the various parts being drawn together by the through bolts 242.

The through bolts above referred to will not interfere materially with the free flow of liquid, inasmuch as said bolts are preferably placed against the back faces of the various turbine and guide vane ring blades, as clearly shown in Figs. 2 and 4.

While I have herein shown and described only certain embodiments of the features of my invention, still I do not intend to limit myself to the same except as I may do so in the claims.

I claim:

1. A transmission unit comprising in combination aligned driving and driven shafts, a centrifugal impeller splined on the driving shaft, a stationary guide vane ring encircling the impeller and provided with a central neutral section, a set of forward control passages to one side thereof, and a set of reverse control passages to the other side thereof, the impeller being shiftable longitudinally of the driving shaft into position to register either with the neutral section or the forward or reverse sections of the guide vane ring, a turbine unit encircling the outer discharge side of the guide vane ring and having forward drive and reversing sections in registry with the forward drive and reversing guide vane ring sections respectively, a stationary casing enclosing all of the elements aforesaid and having independent annular passages encircling the forward and reversing turbine sections respectively, and also having a series of independent longitudinally extending passages communicating alternately with the annular passages aforesaid and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into association with either the forward driving or reverse driving turbine as desired, and means for turning the respective valve members in proper harmony with the movements of the impeller to thereby uncover the discharge ends of the respective sets of passages in harmony with the positions of the impeller, substantially as described.

2. A transmission unit comprising in combination aligned driving and driven shafts, a centrifugal impeller splined on the driving shaft, a stationary guide vane ring encircling the impeller and provided with a central neutral section, a set of forward control passages to one side thereof, and a set of reverse control passages to the other side thereof, the impeller being shiftable longitudinally of the driving shaft into position to register either with the neutral section or the forward or reverse sections of the guide vane ring, a turbine unit encircling the outer discharge side of the guide vane ring and having forward drive and reversing sections in registry with the forward drive and reversing guide vane ring sections respectively, a stationary casing enclosing all of the elements aforesaid and having independent annular passages encircling the forward and reversing turbine sections respectively, and also having a series of independent longitudinally extending passages communicating alternately with the annular passages aforesaid and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into association with either the forward driving or reverse driving turbine as desired, and means for turning the respective valve members to thereby uncover the discharge ends of the respective sets of passages, substantially as described.

3. A transmission unit comprising in combination aligned driving and driven shafts, a centrifugal impeller splined on the driving shaft, a stationary guide vane ring encircling the impeller and provided with a central neutral section, a set of forward control passages to one side thereof, and a set of reverse control passages to the other side thereof, the impeller being shiftable longitudinally of the driving shaft into position to register either with the neutral section or the forward or reverse sections of the guide vane ring, a turbine unit encircling the outer discharge side of the guide vane ring and having forward drive and reversing sections in registry with the forward drive and reversing guide vane ring sections respectively, a stationary casing enclosing all of the elements aforesaid and having independent annular passages encircling the forward and reversing turbine sections respectively, and also having a series of independent longitudinally extending passages communicating alternately with the annular passages aforesaid and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into association with either the forward driving or reverse driving turbine as desired, and means for turning either of the valve members while retaining the other valve member in its normal position, substantially as described.

4. A transmission unit comprising in combination aligned driving and driven shafts, a centrifugal impeller splined on the driving shaft, a stationary guide vane ring encircling the impeller and provided with a central neutral section, a set of forward control passages to one side thereof, and a set of reverse control passages to the other side thereof, the impeller being shiftable longitudinally of the driving shaft into position to register either with the neutral section or the forward or reverse sections of the guide vane ring, a turbine unit encircling the outer discharge side of the guide vane ring and having forward drive and reversing sections in registry with the forward drive and reversing guide vane ring sections respectively, a stationary casing enclosing all of the elements aforesaid and having independent annular passages encircling the forward and reversing turbine sections respectively, and also having a series of independent longitudinally extending passages communicating alternately with the annular passages aforesaid and all reaching towards the driven end of the transmission unit and having their discharge ends turned inwardly towards the axis, and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into complete association with either the forward driving or reverse driving turbine as desired, and means for thereafter turning the corresponding valve member under control of the operator while retaining the other valve member stationary, substantially as described.

5. A transmission unit comprising in combination aligned driving and driven shafts, a centrifugal impeller splined on the driving shaft and shiftable longitudinally thereof into either a forward driving or reversing position, a turbine unit surrounding the impeller and having forward driving and reversing turbine sections, a stationary casing enclosing all of the elements aforesaid and having independent annular passages encircling the forward and reversing turbine sections respectively, and also having a series of independent longitudinally extending passages communicating alternately with the annular passages aforesaid and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into association with either the forward driving or reversing driving turbine as desired, and means for turning either of the valve members while retaining the other valve member in its normal position, substantially as described.

6. A transmission unit comprising in combination aligned driving and driven shafts, a centrifugal impeller splined on the driving shaft and shiftable longitudinally thereof, a turbine unit encircling the impeller and having forward driving and reversing turbine sections, a stationary casing enclosing all of the elements aforesaid and having independent annular passages encircling the forward driving and reversing turbine sections respectively, and also having a series of independent longitudinally extending passages communicating alternately with the annular passages aforesaid, and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means for shifting the position of the impeller on the driving shaft to thereby bring the same into complete association with either the forward driving or reverse driving turbine as desired, and means for thereafter moving the corresponding valve member under control of the operator while retaining the other valve member stationary, substantially as described.

7. A transmission unit comprising in combination aligned driving and driven shafts, a turbine unit drivingly connected to the driven shaft and having forward driving and reversing sections, pumping means in conjunction with the driving shaft and adapted to deliver liquid to the intake side of a selected turbine section, a stationary casing enclosing all of the elements aforesaid and having independent annular passages encircling the turbine sections respectively, and also having a series of independent longitudinally extending passages communicating alternately with the annular passages aforesaid, and all reaching towards the driven end of the transmission unit and having their discharge ends turned inwardly towards the axis and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, means permitting control of the delivery of liquid to either turbine section as desired, and means for turning either of the valve members while retaining the other valve member in its normal position, substantially as described.

8. A transmission unit comprising in combination driving and driven shafts, a turbine unit drivingly connected to the driven shaft and having forward driving and reversing turbine sections, means in conjunction with the driving shaft for delivering liquid to either turbine section as selected under the control of the operator, a stationary casing enclosing all of the elements aforesaid and having independent annular passages encircling the forward driving and reversing turbine sections respectively, and also having a series of independent longitudinally extending passages communicating with each of the annular passages aforesaid and all reaching towards the driven end of the transmission unit, and having their discharge ends turned inwardly towards the axis and terminating within a cylindrical surface concentric with the shafts aforesaid, a pair of telescoped cylindrical valve members adjacent to the discharge ends of the passages aforesaid, one valve member normally sealing the passages of one set and the other valve member normally sealing the passages of the other set, and means for turning either valve member selectively to open the passages of the corresponding set, substantially as described.

9. A transmission unit comprising in combination aligned driving and driven shafts, a turbine unit drivingly connected to the driven shaft and having forward driving and reversing turbine sections, means in conjunction with the driving shaft for delivering liquid to either turbine section as selected under the control of the operator, a stationary casing enclosing all of the elements aforesaid and having independent annular passages encircling the forward driving and reversing turbine sections, respectively, and also having a series of independent longitudinally extending passages communicating with each of the annular passages aforesaid and all reaching towards the driven end of the transmission unit, a pair of valve members in conjunction with the discharge ends of said passages, one valve member normally sealing the passages of one set and the other valve member normally sealing the passages of the other set, and means for shifting either valve member selectively under the control of the operator while retaining the other valve in its normal position, substantially as described.

10. A transmission unit comprising in combination aligned driving and driven shafts, a pump drivingly connected to the driving shaft, a turbine unit drivingly connected to the driven shaft and having forward driving and reversing turbine sections, independent groups of passages in conjunction with the discharge sides of the two turbine sections for the return of liquid to the central portion of the unit, valve mechanism in conjunction with each of said groups of passages, and means under the control of the operator for opening and closing said valve mechanisms independently of each other, substantially as described.

11. A transmission unit comprising in combination aligned driving and driven shafts, a turbine unit drivingly connected to the driven shaft and having two turbine sections, means in conjunction with the driving shaft for delivering liquid to either turbine section selectively under the control of the operator, a stationary casing enclosing all of the elements aforesaid and having independent groups of passages in communication alternately with the discharge sides of the respective turbine sections, the passages of the two groups leading towards the driven end of the machine and having their discharge ends turned inwardly towards the shafts and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, and means under the control of the operator for turning the valve members independently of each other, substantially as described.

12. A transmission unit comprising in combination aligned driving and driven shafts, a turbine unit drivingly connected to the driven shaft and having two turbine elements, means in conjunction with the driving shaft for delivering liquid to the turbine, a stationary casing enclosing all of the elements aforesaid and having two independent groups of passages alternately placed, one of which groups is in communication with the discharge side of each turbine element, the passages of the independent groups leading towards one end of the machine and having their discharge ends turned inwardly towards the shafts and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, and means under the control of the operator for turning the valve members independently of each other, substantially as described.

13. A transmission unit comprising in combination aligned driving and driven shafts, a turbine unit drivingly connected to the driven shaft and having two turbine elements, means in conjunction with the driving shaft for delivering liquid to the turbine, a stationary casing enclosing all of the elements aforesaid and having two independent groups of passages alternately placed, the passages of one group being in communication with the discharge side of each turbine element, the passages of the independent groups leading towards one end of the machine and having their discharge ends turned inwardly towards the shafts and terminating within a cylindrical surface concentric with the shafts aforesaid, a pair of telescoped cylindrical valve members adjacent to the discharge ends of the passages aforesaid, each valve member having a set of ports normally standing in line with the discharge ends of alternate passages and also having intermediate blind spaces normally standing in line with the discharge ends of the intermediate passages, said valve members normally occupying positions with their blind spaces in line with the discharge ends of the two groups of passages, longitudinally extending telescoped sleeves connected to the respective valve members, companion slots in said sleeves, one slot having an axially extending arm, together with a notch at one end offset in one angular direction and the other slot having an axially extending arm, together with a notch at its other end offset in the other angular direction, a pin member engaging both of the slots, means for normally guiding said pin member in a straight axial direction through the full length of the slots, and means permitting angular movement of the pin at either axial extremity of its movement into the corresponding slot notch, substantially as described.

14. A transmission unit comprising in combination aligned driving and driven shafts, a turbine unit drivingly connected to the driven shaft and having two turbine elements, pumping means in conjunction with the driving shaft for delivering liquid to the turbine unit, a stationary casing enclosing all of the elements aforesaid and having two independent groups of passages alternately placed, the passages of the groups being independently in communication with the turbine elements, the passages of the two groups leading towards one end of the machine and having their discharge ends turned inwardly towards the shafts and terminating within a cylindrical surface concentric with the shafts aforesaid, a pair of telescoped cylindrical valve members adjacent to the discharge ends of the passages aforesaid, each valve member having a set of ports and intermediate blind spaces corresponding to the positions of the discharge ends of the passages of the respective groups, and means for moving the valve members selectively comprising axially extending members connected to the respective valve members and having axially and angularly formed slots therein together with means engaging both of the slots and movable axially of the machine, whereby movement of said means in either direction turns one of said valve members independently of the other, substantially as described.

15. A transmission unit comprising in combination aligned driving and driven shafts, a turbine unit drivingly connected to the driven shaft and having two turbine elements, means in conjunction with the driving shaft for delivering liquid to the turbine, a stationary casing enclosing all of the elements aforesaid and having two independent groups of passages therein, the passages of the two groups alternating with respect to each other, all of the passages having their discharge ends terminating within a common surface, and valve mechanism in conjunction with said passages comprising a pair of circular valve members in proximity to each other, each member having ports and blind spaces in alternation corresponding to the ends of the passages of the respective groups, together with means for actuating said valve members comprising a pair of longitudinally extending members, each of which is slotted, the slots having their end portions of angular form and facing in opposite angular directions, and means engaging both of the slots and shiftable longitudinally through them, substantially as described.

16. A transmission unit comprising in combination aligned driving and driven shafts, a turbine unit drivingly connected to the driven shaft and having a plurality of turbine elements, means in conjunction with the driving shaft for delivering liquid to the turbine, a stationary casing enclosing all of the elements aforesaid and having a plurality of groups of passages for the transfer of liquid from the turbine unit, there being as many groups of passages as there are turbine elements, the passages of the respective groups being placed in uniform alternation around the casing, the discharge ends of all of the passages terminating within a common surface, valve mechanism for all of the passages comprising a pair of valve members in proximity to each other, each valve member having a group of ports corresponding to a group of passages together with intermediate blind spaces, and means for moving the valve members selectively under the control of the operator, substantially as described.

17. A transmission unit comprising in combination aligned driving and driven shafts, a turbine unit drivingly connected with the driven shaft and having a plurality of turbine elements, means in conjunction with the driving shaft for delivering liquid to the turbine, a stationary casing enclosing all of the elements aforesaid and having independent groups of passages for the transfer of liquid therethrough, there being as many groups of passages as there are turbine elements, said passages being placed in uniform alternation around the casing, and having their discharge ends terminating within a common surface, valve mechanism for all of the passages comprising a pair of relatively movable valve members, at least one of which is provided with a series of uniformly spaced ports corresponding to the spaces of the passages of one group, and the other valve member having blind spaces corresponding to said ports, and means for moving the valve members selectively under the control of the operator, substantially as described.

18. A transmission unit comprising in combination aligned driving and driven shafts, a turbine unit drivingly connected with the driven shaft and having a plurality of turbine elements, means in conjunction with the driving shaft for delivering liquid to the turbine, a stationary casing enclosing all of the elements aforesaid and having independent groups of passages for the transfer of liquid therethrough, there being as many groups of passages as there are turbine elements, said passages being placed in uniform alternation around the casing and having their discharge ends terminating within a common surface, and valve mechanism for all of the passages comprising a pair of relatively movable valve members having companion ports and blind spaces corresponding to the passages of the casing, whereby when the valve members stand in one position all of the passages are sealed, and whereby either set of passages may be opened at will by selective movement of the valve members, substantially as described.

19. A transmission unit comprising in combination aligned driving and driven shafts, a turbine unit drivingly connected with the driven shaft and having reversing and forward driving turbine sections, the reversing section being closer to the position of the driven shaft than the forward driving turbine section, a stationary casing enclosing all of the elements aforesaid and having independent groups of passages for the transfer of liquid therethrough, all of said passages having their discharge ends terminating within a common surface in proximity to the driven shaft, means in conjunction with the driving shaft for delivering liquid to either turbine section selectively under control of the operator, and valve mechanism for controlling the return of liquid from the passages to the liquid delivering means, substantially as described.

20. A transmission unit comprising in combination aligned driving and driven shafts, a turbine unit drivingly connected with the driven shaft, and having reversing and forward driving turbine sections, the reversing section being closer to the position of the driven shaft than the forward driving turbine section, a centrifugal pump splined to the driving shaft, means for shifting the same into position to deliver liquid to either turbine section as selected, a stationary casing enclosing all of the elements aforesaid and having independent groups of passages for the transfer of liquid therethrough, all of said passages having their discharge ends terminating within a common surface in proximity to the driven shaft, and valve mechanism for controlling the return of liquid from the passages to the centrifugal pump, substantially as described.

21. A power transmission unit comprising in combination aligned driving and driven shafts, a turbine unit drivingly connected with the driven shaft, and including a pair of turbine sections, suitable pumping means in conjunction with the driving shaft and adapted to deliver liquid to either turbine section as desired, suitable passages for the circulation of liquid between the turbine sections and the pumping means, suitable valve mechanism in conjunction with said passages, means for shifting the pumping means into harmony with either turbine section as desired, and means for thereafter actuating the valve mechanism selectively to allow circulation of liquid only from said turbine section under control of the operator, substantially as described.

22. A power transmission unit comprising in combination aligned driving and driven shafts, a turbine unit drivingly connected with the driven shaft and including a pair of turbine sections, suitable pumping means in conjunction with the driving shaft and adapted to deliver liquid to either turbine section as desired, suitable passages for the circulation of liquid between the turbine sections and the pump, suitable valve mechanism in conjunction with said passages, means for shifting the pumping means into harmony with either turbine section as desired, and means for retaining the valve mechanism in position with all of the passages sealed until complete harmony is established between the pumping means and the turbine section and for thereafter permitting flow of liquid only from such turbine section and under control of the operator, substantially as described.

23. A power transmission unit comprising in combination aligned driving and driven shafts, a turbine unit drivingly connected with the driven shaft and including a pair of turbine sections, pumping means in conjunction with the driving shaft and adapted to deliver liquid to either turbine section as desired, suitable passages for the circulation of liquid between the turbine sections and the pump, suitable valve mechanism in conjunction with said passages, and means under the control of the operator for bringing the pumping means into harmony with either turbine section as desired, and sealing all of the passages during such movement and for thereafter permitting flow of liquid only from such turbine section, substantially as described.

24. A power transmission unit comprising in combination aligned driving and driven shafts, a turbine unit drivingly connected with the driven shaft and including a pair of turbine sections, pumping means in conjunction with the driving shaft and adapted to deliver liquid to either turbine section as desired, suitable passages for the circulation of liquid between the turbine sections and the pump, suitable valve mechanism in conjunction with said passages, and means under the control of the operator for bringing the pumping means into harmony with either turbine section as desired with all of the passages sealed during such movement and for thereafter permitting flow of liquid in amount under control of the operator only from such turbine section, substantially as described.

25. A power transmission unit comprising in combination aligned driving and driven shafts, a turbine unit drivingly connected to the driven shaft and including a pair of turbine sections, pumping means in conjunction with the driving shaft and adapted to deliver liquid to either turbine section as desired, suitable passages for the circulation of liquid between the turbine sections and the pump, suitable valve mechanism in conjunction with said passages, and remote control means for bringing the pumping means into harmony with either turbine section as desired with all of the passages sealed during such movement and for thereafter permitting flow of liquid only from such turbine section and under the control of the operator at a distant point, substantially as described.

THOMAS A. BANNING, Jr.